(12) United States Patent
Liu et al.

(10) Patent No.: US 12,376,053 B2
(45) Date of Patent: Jul. 29, 2025

(54) TECHNIQUES FOR SYNCHRONIZATION SIGNAL BLOCK WAVEFORM DESIGN FOR SIDELINK COMMUNICATIONS

(71) Applicant: QUALCOMM INCORPORATED, San Diego, CA (US)

(72) Inventors: Chih-Hao Liu, San Diego, CA (US); Jing Sun, San Diego, CA (US); Xiaoxia Zhang, San Diego, CA (US); Yisheng Xue, San Diego, CA (US); Changlong Xu, Beijing (CN); Tao Luo, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 17/999,293

(22) PCT Filed: Jul. 15, 2020

(86) PCT No.: PCT/CN2020/102133
§ 371 (c)(1),
(2) Date: Nov. 18, 2022

(87) PCT Pub. No.: WO2022/011600
PCT Pub. Date: Jan. 20, 2022

(65) Prior Publication Data
US 2023/0189176 A1 Jun. 15, 2023

(51) Int. Cl.
*H04W 56/00* (2009.01)
*H04L 1/00* (2006.01)

(52) U.S. Cl.
CPC ....... *H04W 56/0015* (2013.01); *H04L 1/0067* (2013.01)

(58) Field of Classification Search
CPC ........... H04W 56/0015; H04W 56/002; H04W 92/18; H04L 1/0067; H04L 5/0007;
(Continued)

(56) References Cited

U.S. PATENT DOCUMENTS

| 2018/0279296 A1* | 9/2018 | Hosseini | ............... H04L 5/0053 |
| 2021/0321384 A1* | 10/2021 | Osawa | .................. H04W 72/20 |
| 2022/0191908 A1* | 6/2022 | Back | ..................... H04L 5/0053 |

FOREIGN PATENT DOCUMENTS

| CN | 110945805 A | 3/2020 |
| WO | WO-2018031111 A1 | 2/2018 |

(Continued)

OTHER PUBLICATIONS

CATT: "Offline summary on AI 7.2.4.1.3 Synchronization Mechanism", R1-1814147, 3GPP TSG RAN1 Meeting #95, 3rd Generation Partnership Project, Mobile Competence Centre, 650, Route Des Lucioles, F-06921 Sophia-Antipolis Cedex, Spokane, USA, Nov. 12-16, France Nov. 19, 2018, pp. 1-20, XP051494604, paragraph [0008]—paragraph [0008].

(Continued)

*Primary Examiner* — Kiet Tang
(74) *Attorney, Agent, or Firm* — Dalei Dong; Holland & Hart LLP

(57) ABSTRACT

Methods, systems, and devices for wireless communications are described. A first user equipment (UE) may determine that that the first UE is scheduled to transmit a control signal and a synchronization signal associated with a synchronization signal block. The first UE may transmit, to a second UE during a first set of symbols within a time period, the control signal associated with a sidelink communication. In some examples, the first UE may transmit, to the second UE during a symbol subsequent to the first set of symbols, the synchronization signal associated with the synchronization (Continued)

signal block, and may communicate with the second UE according to the transmitted control signal and the transmitted synchronization signal.

31 Claims, 18 Drawing Sheets

(58) Field of Classification Search
CPC ..... H04L 5/001; H04L 5/0023; H04L 5/0053; H04L 5/0048
See application file for complete search history.

(56) References Cited

FOREIGN PATENT DOCUMENTS

| WO | WO-2019148411 A1 | 8/2019 |
|----|------------------|--------|
| WO | WO-2020031384 A1 | 2/2020 |
| WO | WO-2020069659 A1 | 4/2020 |
| WO | WO-2020088637 A1 | 5/2020 |

OTHER PUBLICATIONS

Huawei, et al., "Sidelink synchronization mechanisms for NR V2X", R1-1900025, 3rd Generation Partnership Project, Mobile Competence Centre, 650, Route Des Lucioles, F-06921, Sophia-Antipolis Cedex, France, vol. RAN WG1, No. Taipei, Jan. 21, 2019-Jan. 25, 2019, Jan. 20, 2019, XP051592951, 12 Pages, section 2.5, paragraphs [02.1], [02.5], Figures 2,7.
Supplementary European Search Report—EP20945468—Search Authority—The Hague—Mar. 28, 2024.
Intel Corporation: "Synchronization Aspects for LTE V2V Sidelink Carrier Aggregation", 3GPP TSG RAN WG1 Meeting #91, R1-1720032, Reno, USA, 20171127-20171201, pp. 1-5, Dec. 1, 2017 (Dec. 1, 2017), the whole document.
International Search Report and Written Opinion—PCT/CN2020/102133—ISA/EPO—Apr. 16, 2021.
LG Electronics: "Discussion on Synchronization for Sidelink CA", 3GPP TSG RAN WG1 Meeting #92bis, R1-1804511, Sanya, China, Apr. 16, 2018-Apr. 20, 2018, pp. 1-4, Apr. 20, 2018 (Apr. 20, 2018), the whole document.
Taiwan Search Report—TW110124375—TIPO—Dec. 26, 2024.

* cited by examiner

— Physical Sidelink Control Channel

— Primary Synchronization Signal

— Physical Broadcast Channel

— Secondary Synchronization Signal

— Physical Sidelink Control Channel

— Primary Synchronization Signal

— Physical Broadcast Channel

— Secondary Synchronization Signal

TECHNIQUES FOR SYNCHRONIZATION SIGNAL BLOCK WAVEFORM DESIGN FOR SIDELINK COMMUNICATIONS

CROSS REFERENCE

The present Application is a 371 national stage filing of International PCT Application No. PCT/CN2020/102133 by LIU et al. entitled "TECHNIQUES FOR SYNCHRONIZATION SIGNAL BLOCK WAVEFORM DESIGN FOR SIDELINK COMMUNICATIONS," filed Jul. 15, 2020, which is assigned to the assignee hereof, and which is expressly incorporated by reference in its entirety herein.

FIELD OF DISCLOSURE

The present disclosure relates generally to wireless communications and more specifically to techniques for synchronization signal block waveform design for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communication systems may support sidelink communications. Sidelink communications may support communications within a group of UEs. For example, sidelink communications may include communications between a UE and other UEs within a coverage area including the group of UEs. Sidelink communications may be improved, so that UEs may communicate with high reliability.

SUMMARY

The described techniques relate to improved methods, systems, devices, and apparatuses that support techniques for synchronization signal block waveform design for sidelink communications. For example, the described techniques provide for efficient latency reduction techniques and reliable communications in wireless communications systems supporting sidelink communications. The described techniques may enable a communication device, which may be a user equipment (UE) in a wireless communications system (e.g., a vehicle-to-everything (V2X) system, a vehicle-to-vehicle (V2V) network, a cellular V2X (C-V2X) network, a device-to-device (D2D) system, and the like) to implement an updated waveform design for transmitting synchronization signal blocks in sidelink communications. According to one or more aspects, a UE may employ synchronization signal block transmissions in sidelink communications. In some examples, the UE may transmit a control signal during a first set of symbols in a slot. The UE may determine that a synchronization signal block is mapped to a second set of symbols in the slot. To ensure phase continuity, the UE may map a repetition of a synchronization signal from the synchronization signal block in a gap symbol between the first set of symbols and the second set of symbols. The UE may then transmit the synchronization signal during a symbol subsequent to the first set of symbols.

A method of wireless communication at a first UE is described. The method may include determining that the first UE is scheduled to transmit a control signal and a synchronization signal associated with a synchronization signal block, transmitting, to a second UE during a first set of symbols within a time period, the control signal associated with a sidelink communication, transmitting, to the second UE during a symbol subsequent to the first set of symbols, the synchronization signal associated with the synchronization signal block, and communicating with the second UE according to the transmitted control signal and the transmitted synchronization signal.

An apparatus for wireless communication at a first UE is described. The apparatus may include a processor, memory coupled with the processor, and instructions stored in the memory. The instructions may be executable by the processor to cause the apparatus to determine that the first UE is scheduled to transmit a control signal and a synchronization signal associated with a synchronization signal block, transmit, to a second UE during a first set of symbols within a time period, the control signal associated with a sidelink communication, transmit, to the second UE during a symbol subsequent to the first set of symbols, the synchronization signal associated with the synchronization signal block, and communicate with the second UE according to the transmitted control signal and the transmitted synchronization signal.

Another apparatus for wireless communication at a first UE is described. The apparatus may include means for determining that the first UE is scheduled to transmit a control signal and a synchronization signal associated with a synchronization signal block, transmitting, to a second UE during a first set of symbols within a time period, the control signal associated with a sidelink communication, transmitting, to the second UE during a symbol subsequent to the first set of symbols, the synchronization signal associated with the synchronization signal block, and communicating with the second UE according to the transmitted control signal and the transmitted synchronization signal.

A non-transitory computer-readable medium storing code for wireless communication at a first UE is described. The code may include instructions executable by a processor to determine that the first UE is scheduled to transmit a control signal and a synchronization signal associated with a synchronization signal block, transmit, to a second UE during a first set of symbols within a time period, the control signal associated with a sidelink communication, transmit, to the second UE during a symbol subsequent to the first set of symbols, the synchronization signal associated with the synchronization signal block, and communicate with the second UE according to the transmitted control signal and the transmitted synchronization signal.

Some examples of the method, apparatuses, and non-transitory computer-readable medium described herein may further include operations, features, means, or instructions for identifying that the control signal may be mapped to the first set of symbols including a first symbol and a second symbol, and identifying that a primary synchronization signal may be mapped to a second set of symbols subsequent to the first set of symbols within the time period, the second set of symbols including a third symbol, a fourth symbol, and a fifth symbol, where transmitting the synchronization signal during the symbol includes transmitting the primary synchronization signal during the third symbol.

Some examples of the method, apparatuses, and non-transitory computer-readable medium described herein may further include operations, features, means, or instructions for identifying that the control signal may be mapped to the first set of symbols including a first symbol, a second symbol and a third symbol, and identifying that a primary synchronization signal may be mapped to a second set of symbols subsequent to the first set of symbols within the time period, the second set of symbols including a fourth symbol, and a fifth symbol, where transmitting the synchronization signal during the symbol includes transmitting the primary synchronization signal during the fourth symbol.

Some examples of the method, apparatuses, and non-transitory computer-readable medium described herein may further include operations, features, means, or instructions for identifying that the control signal may be mapped to the first set of symbols including a first symbol and a second symbol, and identifying that a signal associated with a physical broadcast channel may be mapped to a second set of symbols subsequent to the first set of symbols within the time period, the second set of symbols including a third symbol and a fourth symbol, where transmitting the synchronization signal during the symbol includes transmitting the signal associated with the physical broadcast channel during the third symbol.

Some examples of the method, apparatuses, and non-transitory computer-readable medium described herein may further include operations, features, means, or instructions for identifying that the control signal may be mapped to the first set of symbols including a first symbol, a second symbol and a third symbol, and identifying that a signal associated with a physical broadcast channel may be mapped to a fourth symbol subsequent to the first set of symbols within the time period, where transmitting the synchronization signal during the symbol includes transmitting the signal associated with the physical broadcast channel during the fourth symbol.

Some examples of the method, apparatuses, and non-transitory computer-readable medium described herein may further include operations, features, means, or instructions for transmitting, to the second UE during a fifth symbol subsequent to the fourth symbol, a primary synchronization signal, and transmitting, to the second UE during a sixth symbol subsequent to the fifth symbol, a repetition of the signal associated with a physical broadcast channel. Some examples of the method, apparatuses, and non-transitory computer-readable medium described herein may further include operations, features, means, or instructions for identifying that the control signal may be mapped to the first set of symbols including a first symbol and a second symbol, and rate matching a signal associated with a physical broadcast channel to a second set of symbols including a third symbol subsequent to the first set of symbols within the time period, where transmitting the synchronization signal during the symbol includes transmitting the signal associated with the physical broadcast channel during the third symbol.

Some examples of the method, apparatuses, and non-transitory computer-readable medium described herein may further include operations, features, means, or instructions for transmitting, to the second UE during a third set of symbols, a first set of synchronization signals associated with the synchronization signal block, where the second set of symbols may be a subset of the third set of symbols, and transmitting, to the second UE during a fourth set of symbols subsequent to the third set of symbols, a second set of synchronization signals associated with a second synchronization signal block.

In some examples of the method, apparatuses, and non-transitory computer-readable medium described herein, a second symbol subsequent to the fourth set of symbols within the time period includes a repetition of a signal associated with a second physical broadcast channel included in the second synchronization signal block.

In some examples of the method, apparatuses, and non-transitory computer-readable medium described herein, a second symbol subsequent to the fourth set of symbols within the time period includes a gap symbol. In some examples of the method, apparatuses, and non-transitory computer-readable medium described herein, the second set of symbols includes four symbols.

Some examples of the method, apparatuses, and non-transitory computer-readable medium described herein may further include operations, features, means, or instructions for identifying that the control signal may be mapped to the first set of symbols including a first symbol, a second symbol and a third symbol, and rate matching a signal associated with a physical broadcast channel to a second set of symbols including a fourth symbol subsequent to the first set of symbols within the time period, where transmitting the synchronization signal during the symbol includes transmitting the signal associated with the physical broadcast channel during the fourth symbol.

Some examples of the method, apparatuses, and non-transitory computer-readable medium described herein may further include operations, features, means, or instructions for identifying that the synchronization signal block may be mapped to a second set of symbols subsequent to the first set of symbols, the synchronization signal block including a primary synchronization signal, a secondary synchronization signal and a physical broadcast channel.

Some examples of the method, apparatuses, and non-transitory computer-readable medium described herein may further include operations, features, means, or instructions for determining that a first set of resource blocks may be mapped to the secondary synchronization signal and a second set of resource blocks may be mapped to the physical broadcast channel in a first symbol included in the second set of symbols. Some examples of the method, apparatuses, and non-transitory computer-readable medium described herein may further include operations, features, means, or instructions for transmitting, during the first symbol, the first set of resource blocks mapped to the secondary synchronization signal, the second set of resource blocks may be mapped to the physical broadcast channel and one or more additional resource blocks mapped to the physical broadcast channel.

Some examples of the method, apparatuses, and non-transitory computer-readable medium described herein may further include operations, features, means, or instructions for identifying one or more empty resource elements consecutive to the first set of resource blocks mapped to the secondary synchronization signal, mapping the physical broadcast channel to the one or more empty resource elements in the first symbol, and transmitting, during the first symbol, the first set of resource blocks mapped to the secondary synchronization signal, the second set of resource blocks may be mapped to the physical broadcast channel and the one or more mapped resource elements.

In some examples of the method, apparatuses, and non-transitory computer-readable medium described herein, a sum of the first set of resource blocks, the second set of resource blocks and the one or more mapped resource elements include a total number of resource blocks mapped to the physical broadcast channel in a second symbol consecutive to the first symbol. Some examples of the method, apparatuses, and non-transitory computer-readable medium described herein may further include operations, features, means, or instructions for determining that a first set of resource blocks may be mapped to the primary synchronization signal in a first symbol included in the second set of symbols.

Some examples of the method, apparatuses, and non-transitory computer-readable medium described herein may further include operations, features, means, or instructions for transmitting, during the first symbol, the first set of resource blocks mapped to the primary synchronization signal and a second set of resource blocks may be mapped to the physical broadcast channel.

Some examples of the method, apparatuses, and non-transitory computer-readable medium described herein may further include operations, features, means, or instructions for rating matching a signal associated with the physical broadcast channel on the second set of resource blocks.

Some examples of the method, apparatuses, and non-transitory computer-readable medium described herein may further include operations, features, means, or instructions for determining a first energy per resource element associated with a physical broadcast channel and a second energy per resource element associated with a primary synchronization signal, where the synchronization signal block includes the primary synchronization signal, a secondary synchronization signal and the physical broadcast channel.

Some examples of the method, apparatuses, and non-transitory computer-readable medium described herein may further include operations, features, means, or instructions for transmitting, during a first symbol, a signal associated with the physical broadcast channel using a third energy per resource element, where the third energy per resource element may be less than the first energy per resource element, and transmitting, during a second symbol subsequent to the first symbol, the primary synchronization signal using a fourth energy per resource element, where the fourth energy per resource element may be greater than the second energy per resource element.

Some examples of the method, apparatuses, and non-transitory computer-readable medium described herein may further include operations, features, means, or instructions for identifying that the synchronization signal block may be mapped to a second set of symbols subsequent to the first set of symbols within the time period, identifying that a second synchronization signal block may be mapped to a third set of symbols subsequent to the second set of symbols within the time period, and transmitting, to the second UE during the third set of symbols, a set of synchronization signals associated with the second synchronization signal block.

In some examples of the method, apparatuses, and non-transitory computer-readable medium described herein, a sequence for a primary synchronization signal associated with a direct interface may be same as the sequence for the primary synchronization signal associated with a network interface.

In some examples of the method, apparatuses, and non-transitory computer-readable medium described herein, a sequence for a secondary synchronization signal associated with a direct interface may be same as the sequence for the secondary synchronization signal associated with a network interface. In some examples of the method, apparatuses, and non-transitory computer-readable medium described herein, a sequence for a primary synchronization signal includes a binary phase shift keying sequence.

Some examples of the method, apparatuses, and non-transitory computer-readable medium described herein may further include operations, features, means, or instructions for transmitting, during a first symbol, a secondary synchronization signal included in the synchronization signal block, and transmitting, during a second symbol after the first symbol, a primary synchronization signal included in the synchronization signal block.

In some examples of the method, apparatuses, and non-transitory computer-readable medium described herein, a payload associated with a physical broadcast channel included in the synchronization signal block includes one or more bits associated with time division duplex indicator and one or more bits associated with coverage indication. In some examples of the method, apparatuses, and non-transitory computer-readable medium described herein, the control signal includes a physical sidelink control channel.

In some examples of the method, apparatuses, and non-transitory computer-readable medium described herein, the synchronization signal block may be multiplexed with a physical sidelink shared channel. In some examples of the method, apparatuses, and non-transitory computer-readable medium described herein, the time period includes a time slot.

A method of wireless communication at a first UE is described. The method may include receiving, from a second UE during a first set of symbols within a time period, a control signal associated with a sidelink communication, receiving, from the second UE during a symbol subsequent to the first set of symbols, a synchronization signal associated with a synchronization signal block, and communicating with the second UE according to the received control signal and the received synchronization signal.

An apparatus for wireless communication at a first UE is described. The apparatus may include a processor, memory coupled with the processor, and instructions stored in the memory. The instructions may be executable by the processor to cause the apparatus to receive, from a second UE during a first set of symbols within a time period, a control signal associated with a sidelink communication, receive, from the second UE during a symbol subsequent to the first set of symbols, a synchronization signal associated with a synchronization signal block, and communicate with the second UE according to the received control signal and the received synchronization signal.

Another apparatus for wireless communication at a first UE is described. The apparatus may include means for receiving, from a second UE during a first set of symbols within a time period, a control signal associated with a sidelink communication, receiving, from the second UE during a symbol subsequent to the first set of symbols, a synchronization signal associated with a synchronization signal block, and communicating with the second UE according to the received control signal and the received synchronization signal.

A non-transitory computer-readable medium storing code for wireless communication at a first UE is described. The code may include instructions executable by a processor to receive, from a second UE during a first set of symbols within a time period, a control signal associated with a sidelink communication, receive, from the second UE during a symbol subsequent to the first set of symbols, a synchronization signal associated with a synchronization signal block, and communicate with the second UE according to the received control signal and the received synchronization signal.

Some examples of the method, apparatuses, and non-transitory computer-readable medium described herein may further include operations, features, means, or instructions for identifying that the control signal may be mapped to the first set of symbols including a first symbol and a second symbol, and identifying that a primary synchronization signal may be mapped to a second set of symbols subsequent to the first set of symbols within the time period, the second set of symbols including a third symbol, a fourth symbol, and a fifth symbol, where receiving the synchronization signal during the symbol includes receiving the primary synchronization signal during the third symbol.

Some examples of the method, apparatuses, and non-transitory computer-readable medium described herein may further include operations, features, means, or instructions for identifying that the control signal may be mapped to the first set of symbols including a first symbol, a second symbol and a third symbol, and identifying that a primary synchronization signal may be mapped to a second set of symbols subsequent to the first set of symbols within the time period, the second set of symbols including a fourth symbol, and a fifth symbol, where receiving the synchronization signal during the symbol includes receiving the primary synchronization signal during the fourth symbol.

Some examples of the method, apparatuses, and non-transitory computer-readable medium described herein may further include operations, features, means, or instructions for identifying that the control signal may be mapped to the first set of symbols including a first symbol and a second symbol, and identifying that a signal associated with a physical broadcast channel may be mapped to a second set of symbols subsequent to the first set of symbols within the time period, the second set of symbols including a third symbol and a fourth symbol, where receiving the synchronization signal during the symbol includes receiving the signal associated with the physical broadcast channel during the third symbol.

Some examples of the method, apparatuses, and non-transitory computer-readable medium described herein may further include operations, features, means, or instructions for identifying that the control signal may be mapped to the first set of symbols including a first symbol, a second symbol and a third symbol, and identifying that a signal associated with a physical broadcast channel may be mapped to a fourth symbol subsequent to the first set of symbols within the time period, where receiving the synchronization signal during the symbol includes receiving the signal associated with the physical broadcast channel during the fourth symbol.

Some examples of the method, apparatuses, and non-transitory computer-readable medium described herein may further include operations, features, means, or instructions for receiving, from the second UE during a fifth symbol subsequent to the fourth symbol, a primary synchronization signal, and receiving, from the second UE during a sixth symbol subsequent to the fifth symbol, a repetition of the signal associated with a physical broadcast channel.

Some examples of the method, apparatuses, and non-transitory computer-readable medium described herein may further include operations, features, means, or instructions for identifying that the control signal may be mapped to the first set of symbols including a first symbol and a second symbol, where a signal associated with a physical broadcast channel may be rate matched to a second set of symbols including a third symbol subsequent to the first set of symbols within the time period, and where receiving the synchronization signal during the symbol includes receiving the signal associated with the physical broadcast channel during the third symbol.

Some examples of the method, apparatuses, and non-transitory computer-readable medium described herein may further include operations, features, means, or instructions for receiving, from the second UE during a third set of symbols, a first set of synchronization signals associated with the synchronization signal block, where the second set of symbols may be a subset of the third set of symbols, and receiving, from the second UE during a fourth set of symbols subsequent to the third set of symbols, a second set of synchronization signals associated with a second synchronization signal block.

In some examples of the method, apparatuses, and non-transitory computer-readable medium described herein, a second symbol subsequent to the fourth set of symbols within the time period includes a repetition of a signal associated with a second physical broadcast channel included in the second synchronization signal block. In some examples of the method, apparatuses, and non-transitory computer-readable medium described herein, a second symbol subsequent to the fourth set of symbols within the time period includes a gap symbol. In some examples of the method, apparatuses, and non-transitory computer-readable medium described herein, the second set of symbols includes four symbols.

Some examples of the method, apparatuses, and non-transitory computer-readable medium described herein may further include operations, features, means, or instructions for identifying that the control signal may be mapped to the first set of symbols including a first symbol, a second symbol and a third symbol, where a signal associated with a physical broadcast channel may be rate matched to a second set of symbols including a fourth symbol subsequent to the first set of symbols within the time period, and where transmitting the synchronization signal during the symbol includes transmitting the signal associated with the physical broadcast channel during the fourth symbol.

Some examples of the method, apparatuses, and non-transitory computer-readable medium described herein may further include operations, features, means, or instructions for identifying that the synchronization signal block may be mapped to a second set of symbols subsequent to the first set of symbols, the synchronization signal block including a primary synchronization signal, a secondary synchronization signal and a physical broadcast channel.

Some examples of the method, apparatuses, and non-transitory computer-readable medium described herein may further include operations, features, means, or instructions for determining that a first set of resource blocks may be mapped to the secondary synchronization signal and a second set of resource blocks may be mapped to the physical broadcast channel in a first symbol included in the second set of symbols.

Some examples of the method, apparatuses, and non-transitory computer-readable medium described herein may further include operations, features, means, or instructions for receiving, during the first symbol, the first set of resource blocks mapped to the secondary synchronization signal, the second set of resource blocks may be mapped to the physical broadcast channel and one or more additional resource blocks mapped to the physical broadcast channel.

Some examples of the method, apparatuses, and non-transitory computer-readable medium described herein may further include operations, features, means, or instructions for receiving, during the first symbol, the first set of resource blocks mapped to the secondary synchronization signal, the second set of resource blocks may be mapped to the physical broadcast channel and the one or more empty resource elements mapped to the physical broadcast channel, where the or more empty resource elements may be consecutive to the first set of resource blocks mapped to the secondary synchronization signal.

In some examples of the method, apparatuses, and non-transitory computer-readable medium described herein, a sum of the first set of resource blocks, the second set of resource blocks and the one or more mapped resource elements include a total number of resource blocks mapped to the physical broadcast channel in a second symbol consecutive to the first symbol. Some examples of the method, apparatuses, and non-transitory computer-readable medium described herein may further include operations, features, means, or instructions for determining that a first set of resource blocks may be mapped to the primary synchronization signal in a first symbol included in the second set of symbols.

Some examples of the method, apparatuses, and non-transitory computer-readable medium described herein may further include operations, features, means, or instructions for receiving, during the first symbol, the first set of resource blocks mapped to the primary synchronization signal and a second set of resource blocks may be mapped to the physical broadcast channel.

In some examples of the method, apparatuses, and non-transitory computer-readable medium described herein, a signal associated with the physical broadcast channel may be rate matched on the second set of resource blocks. Some examples of the method, apparatuses, and non-transitory computer-readable medium described herein may further include operations, features, means, or instructions for identifying that the synchronization signal block may be mapped to a second set of symbols subsequent to the first set of symbols within the time period, identifying that a second synchronization signal block may be mapped to a third set of symbols subsequent to the second set of symbols within the time period, and receiving, from the second UE during the third set of symbols, a set of synchronization signals associated with the second synchronization signal block.

In some examples of the method, apparatuses, and non-transitory computer-readable medium described herein, a sequence for a primary synchronization signal associated with a direct interface may be same as the sequence for the primary synchronization signal associated with a network interface. In some examples of the method, apparatuses, and non-transitory computer-readable medium described herein, a sequence for a secondary synchronization signal associated with a direct interface may be same as the sequence for the secondary synchronization signal associated with a network interface.

In some examples of the method, apparatuses, and non-transitory computer-readable medium described herein, a sequence for a primary synchronization signal includes a binary phase shift keying sequence. Some examples of the method, apparatuses, and non-transitory computer-readable medium described herein may further include operations, features, means, or instructions for receiving, during a first symbol, a secondary synchronization signal included in the synchronization signal block, and receiving, during a second symbol after the first symbol, a primary synchronization signal included in the synchronization signal block.

In some examples of the method, apparatuses, and non-transitory computer-readable medium described herein, a payload associated with a physical broadcast channel included in the synchronization signal block includes one or more bits associated with time division duplex indicator and one or more bits associated with coverage indication. In some examples of the method, apparatuses, and non-transitory computer-readable medium described herein, the control signal includes a physical sidelink control channel.

In some examples of the method, apparatuses, and non-transitory computer-readable medium described herein, the synchronization signal block may be multiplexed with a physical sidelink shared channel. In some examples of the method, apparatuses, and non-transitory computer-readable medium described herein, the time period includes a time slot.

DETAILED DESCRIPTION

Figure 1:
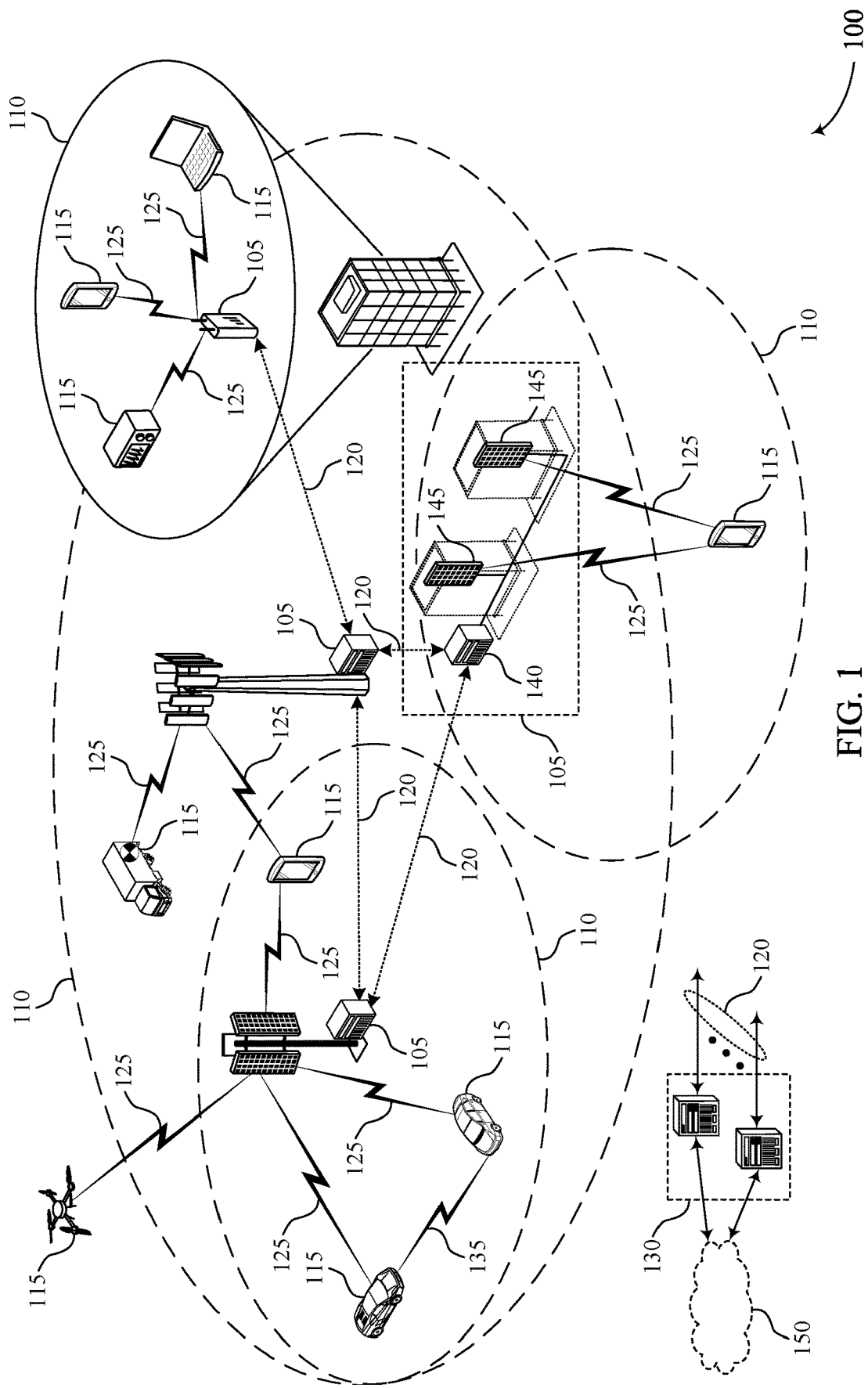
FIG. 1 illustrates an example of a wireless communications system that supports techniques for synchronization signal block waveform design for sidelink communications in accordance with aspects of the present disclosure.

A wireless communications system may support both access links and sidelinks for communications between one or more communication devices. An access link may refer to a communication link between a user equipment (UE) and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

Sidelink communications may support communications within a group of UEs. For example, sidelink communications may include communications between a UE and other UEs within a coverage area including the group of UEs (e.g., a coverage area provided by a base station, a coverage area outside of the coverage area provided by the base station, or a combination thereof). One or more of the UEs in the group of UEs may initiate sidelink communications with other UEs in the group of UEs. For example, a UE may have information to transmit to the group of UEs (e.g., a detection of an object or obstacle on a road in a V2X system, scheduling information, among other examples) and the UE may initiate a sidelink communications including the information to the other UEs. The other UEs may monitor sidelink resource pools for the sidelink communications. In some examples, base stations may not be involved in sidelink communications because multiple UEs on the sidelink may receive a data transmission from a single UE, or a single UE may receive data transmissions from multiple UEs. A UE may employ synchronization signal block transmissions in sidelink communications. Updating waveform design for synchronization signal block transmission in wireless communications systems supporting sidelink communications may be desired.

One or more aspects of the present disclosure provide for wireless communications systems supporting sidelink communications to transmit a synchronization signal in a gap symbol between a control signal transmission and transmission of synchronization signals associated with a synchronization signal block. In one example, a UE may determine that the UE is scheduled to transmit a control signal and a synchronization signal associated with a synchronization signal block. The UE may transmit, during a first set of symbols within a time period, the control signal associated with a sidelink communication. The UE may then transmit, during a symbol subsequent to the first set of symbols, the synchronization signal associated with the synchronization signal block. In some cases, the UE may communicate according to the transmitted control signal and the transmitted synchronization signal.

UEs capable of sidelink communications may utilize the techniques described herein to experience power saving, such as reduced power consumption and extended battery life while ensuring reliable and efficient communications in the group of UEs. Some aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. In some examples, the UEs may support high reliability and low latency communications, among other examples, in accordance with aspects of the present disclosure. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are further described in the context of one or more configurations. Aspects of the disclosure are further illustrated by and described with reference to apparatus diagrams, system diagrams, and flowcharts that relate to techniques for synchronization signal block waveform design for sidelink communications.

FIG. 1 illustrates an example of a wireless communications system 100 that supports techniques for synchronization signal block waveform design for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications system may support both access links and sidelinks for communications between one or more communication devices. An access link may refer to a communication link between a UE and a base station. A sidelink may refer to any communication link between similar wireless devices (e.g., a communication link between UEs, or a backhaul communication link between base stations). A wireless device may transmit and receive synchronization signal blocks to and from another wireless device over a wireless channel. A wireless device may employ synchronization signal block transmissions in sidelink operations. In wireless communications systems supporting sidelink communications, there may be a gap symbol between a control signal and a synchronization signal block transmission. During operating in an unlicensed spectrum, the gap symbol may be occupied by another wireless device resulting is a phase discontinuity. Thus, it may be desirable to update a waveform design for synchronization signal block transmission in wireless communications systems supporting sidelink communications.

According to one or more aspects of the present disclosure, a wireless device (e.g., UE 115) may be configured to transmit a signal included in a synchronization signal block in the gap symbol. In one example, a transmitter UE 115 may determine that the transmitter UE 115 is scheduled to transmit a control signal and a synchronization signal associated with a synchronization signal block. The transmitter UE 115 may transmit, during a first set of symbols within a time period, the control signal associated with a sidelink communication. The transmitter UE 115 may then transmit, during a symbol subsequent to the first set of symbols, the synchronization signal associated with the synchronization signal block. For example, the transmitter UE 115 may transmit a sidelink control channel on symbol 1, symbol 2 and symbol 3 of a slot. To maintain phase continuity after the sidelink control channel, the transmitter UE 115 may transmit the synchronization signal associated with the synchronization signal block in symbol 4 of the slot.

Figure 2:
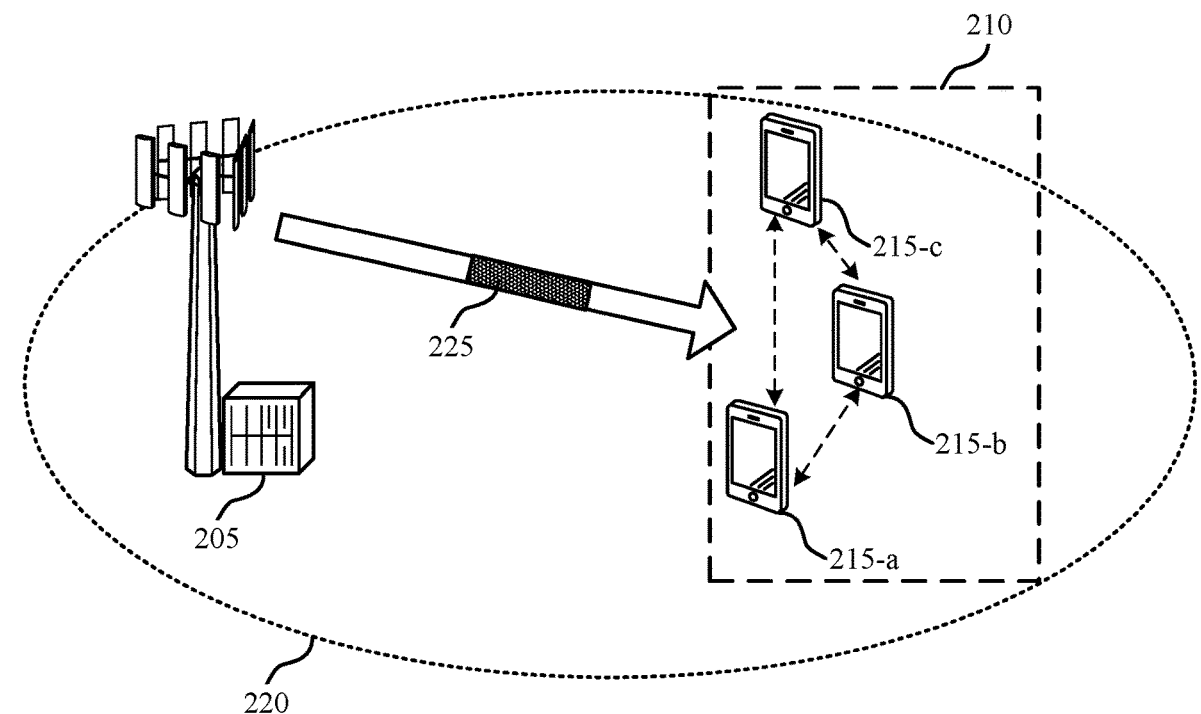
FIG. 2 illustrates an example of a wireless communications system that supports techniques for synchronization signal block waveform design for sidelink communications in accordance with aspects of the present disclosure.

FIG. 2 illustrates an example of a wireless communications system 200 that supports techniques for synchronization signal block waveform design for sidelink communications in accordance with aspects of the present disclosure. In some examples, the wireless communications system 200 may implement aspects of wireless communications system 100. The wireless communications system 200 includes base station 205, geographic coverage area 220, and one or more UEs 215. In some cases, the wireless communications system 200 may utilize control signaling 225 to schedule resources for UEs 215 to perform sidelink communications. Additionally or alternatively, the UEs 215 in the wireless communications system 200 may utilize shared information to enhance scheduling, inter-UE coordination, and communications flexibility. In some examples, the group of UEs 215 (e.g., UE 215-*a*, UE 215-*b*, and UE 215-*c*) may communicate with each other (e.g., within a V2X system, a D2D system, and the like) and may employ sidelink transmissions to save power, reduce latency, and ensure reliable communications. In some examples, vehicles may communicate using V2X resource allocation mode 2 (that utilizes UE autonomous resource selection).

The wireless communications system 200 may support both access links and sidelinks for communications between one or more communication devices. An access link may refer to a communication link between a UE 215 (such as, UE 215-*a*, UE 215-*b* and UE 215-*c*) and a base station 205. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE to one or more other UEs.

Base station 205 may communicate with one or more UEs 215 (e.g., UE 215-*a*, UE 215-*b*, and UE 215-*c*), which may be included within a UE group 210. For example, the base station 205 may transmit control information to the UE 215-*a*, the UE 215-*b*, or the UE 215-*c*. As depicted in the example of FIG. 2, the UE 215-*a*, the UE 215-*b*, and the UE 215-*c* may communicate with each other (or with another group of UEs 215) over sidelink communications (e.g., using a peer-to-peer (P2P) or D2D protocol). In some cases, the UE 215-*a* may transmit sidelink transmissions to the UE 215-*b* or the UE 215-*c*. In some examples, UE 215-*a* or UE 215-*b* may monitor resource pools for the sidelink communications or indications of the sidelink communications (e.g., resource reservations, control channel transmissions, among other examples) from other UEs 215 in the group. Additionally or alternatively, the UEs 215 may have data to transmit to (or receive from) one or more of the UEs 215 in the group and may use the sidelink communications to transmit the data transmission. In some examples, the group of UEs 215 may utilize sidelinks communications in addition to access links with the base station 205.

In some examples, sidelink communications may support communications within a group of UEs 215 (e.g., group 210). For instance, sidelink communications may include communications between a UE (such as, UE 215-*a*, UE 215-*b*, and UE 215-*c*) and other UEs 215 within a coverage area including the group of UEs (e.g., a coverage area provided by a base station, a coverage area outside of the coverage area provided by the base station, or a combination thereof). One or more of the UEs 215 in the group of UEs 215 may initiate sidelink communications with other UEs in the group of UEs. For example, one or more of the UEs 215 may be in a coverage area 210 (e.g., a coverage area 110 with reference to FIG. 1) of the base station 205. In such examples, a UE 215 may communicate with the base station 205 via a Uu interface (e.g., the base station 205 may transmit downlink communications to one or more of the UEs 215 via an access link). In some other examples, the group of UEs 215 may not be inside the coverage area or may not communicate with the base station 205 using an access link.

In some cases, a UE 215 (such as, UE 215-*a*, UE 215-*b*, and UE 215-*c*) may have information (e.g., a detection of an object or obstacle on a road in a V2X system, scheduling information, among other examples) to transmit to the group of UEs 215, and the UE 215 may initiate sidelink communications including the information to the other UEs 215. In such cases, the UE 215 initiating the sidelink communications may be referred to as a transmitting UE and the UE 215 receiving the sidelink communications may be referred to as a receiving UE. In some examples, the base station 205 may configure sidelink communication resources for the group of UEs using a configuration message. In one example, the base station 205 may optionally communicate a control signaling 225 indicating a resource allocation for one or more UEs included in the group of UEs.

In some wireless communications systems, a UE from the group of UEs may be allowed to select sidelink transmission resources. In some examples, NR V2X communication may support two modes of resource allocation mechanism: Mode 1 (where the resource is scheduled by a base station) and Mode 2 (where the UE performs an autonomous resource selection). In some wireless communications systems, a device may transmit and receive synchronization signal blocks to and from another device over a wireless channel. A wireless device (e.g., UE 215) may employ synchronization signal block transmissions in sidelink operations. In some examples, synchronization signal block waveform for sidelink could be beneficial as it supports discovery reference signal window for listen before talk mechanism. Additionally, the synchronization signal block transmission may be beneficial in quasi co-located beam sweeping operations.

In some examples, a base station and a UE may use remaining minimum system information during synchronization signal block transmissions. However, unlike communications between a base station and a UE, remaining minimum system information may not be available in sidelink communications. As a result, in sidelink communications, there may be a gap symbol between a control signal and a synchronization signal block. In some examples, during operating in an unlicensed spectrum, the gap symbol may be occupied by another device resulting is a phase discontinuity. Thus, a waveform design for synchronization signal block may be improved for sidelink communications. More specifically, an updated waveform design for synchronization signal block may be desired for sidelink communications using unlicensed spectrum. Additionally or alternatively, an updated waveform design for synchronization signal block transmission may be desired for maintaining transmission phase continuity at a wireless device (e.g., UE). For instance, the waveform design may be updated to address physical broadcast channel continuity across symbols for transmitting a synchronization signal block. In some cases, the waveform design may be updated to address physical sidelink shared channel phase continuity when a synchronization signal block is multiplexed with an interlaced physical sidelink control channel or physical sidelink shared channel waveform. In some examples, updated waveform designs may prevent direct interface (e.g., Uu) synchronization on sidelink synchronization signal blocks when a direct interface and a network interface exist on a same synchronization raster. Additionally or alternatively, physical broadcast channel payload may need to be updated for sidelink communications.

According to one or more aspects of the present disclosure, a UE (such as, UE 215-*a*, UE 215-*b*, and UE 215-*c*) may be configured to transmit a signal included in a synchronization signal block in a gap symbol. As one example, a first UE 215-*a* (e.g., transmitting UE) may determine that the first UE 215-*a* is scheduled to transmit a control signal and a synchronization signal associated with a synchronization signal block. The first UE 215-*a* may transmit the control signal during a first set of symbols within a time period. For instance, the first UE 215-*a* may transmit the control signal to a second UE 215-*b* (e.g., receiving UE). The first UE 215-*a* may then transmit the synchronization signal during a symbol subsequent to the first set of symbols. In one example, the first UE 215-*a* may transmit a physical sidelink control channel mapped to a first symbol (symbol 1), a second symbol (symbol 2), and a third symbol (symbol 3) of a slot. In some wireless communications systems, a synchronization signal block in the slot is mapped to a fifth symbol (symbol 5), a sixth symbol (symbol 6), a seventh symbol (symbol 7) and an eight symbol (symbol 8) of the slot. To maintain phase continuity between the physical sidelink control channel and the synchronization signal block, one or more aspects of the present disclosure provides for mapping a synchronization signal (e.g., a primary synchronization signal or a physical broadcast channel) on the fourth symbol (symbol 4) on the slot. In another example, where the first UE 215-a transmits a physical sidelink control channel on a first symbol (symbol 1) and a second symbol (symbol 2) a slot, and the synchronization signal block in the slot is mapped to a fifth symbol (symbol 5), a sixth symbol (symbol 6), a seventh symbol (symbol 7) and an eight symbol (symbol 8) of the slot, one or more aspects of the present disclosure provides for mapping a synchronization signal (e.g., a primary synchronization signal or a physical broadcast channel) on a third symbol (symbol 3) and a fourth symbol (symbol 4).

In some examples, for the coexistence of synchronization signal block transmissions in direct interface and network interface, the synchronization signal blocks in each interface may have different interpretation of a payload associated with the physical broadcast channel. One or more aspects of the present disclosure may provide for a new synchronization raster for each of the direct interface and the network interface. In one example, the network interface may include one raster per 200 MHz channel. Additionally or alternatively, a direct interface and a network interface may share the same sequence for primary synchronization signal or secondary synchronization signal. In some examples, a sequence for a primary synchronization signal associated with a direct interface may be same as the sequence for the primary synchronization signal associated with a network interface. In some examples, a sequence for a secondary synchronization signal associated with a direct interface may be same as the sequence for the secondary synchronization signal associated with a network interface. In some examples, a UE may be configured to search in the new raster when performing sidelink communications. In some examples, a sequence for a primary synchronization signal may include a binary phase shift keying sequence. In one example of NR, the primary synchronization signal may include a binary phase shift keying sequence of length 127 with one or more cyclic shifts (e.g., 0, 43, 86). In direct interface, the primary synchronization signal may include a binary phase shift keying sequence of length 127 with one or more cyclic shifts other than 0, 43 and 86. In some examples, the location for transmitting the primary synchronization signal and the secondary synchronization signal may be swapped in sidelink communications.

According to one or more aspects, a design for a payload for a physical broadcast channel may be updated in sidelink communications. In some cases, a payload for a physical broadcast channel may be designed according to Table 1:

TABLE 1

| PBCH contents | Number of bits |
| --- | --- |
| SFN (6 LSB) | 6 |
| subCarrierSpacingCommon | 1 |
| Ssb-subcarrierOffset (LSB) | 4 |
| Dmrs-TypeA-Position | 1 |
| controlResourceSetZero | 4 |
| searchSpaceZero | 4 |
| CellBarred | 1 |
| intraFreqResel | 1 |
| Reserve bits | 1 |
| BCCH type | 1 |
| Physical payload | 8 |
| CRC | 24 |
| Total bits | 56 |

In some examples, one or more fields in NR PBCH physical broadcast channel in NR may not be useful for sidelink communications. For example, the 1 bit of the field subCarrierSpacingCommon, 1 bit of the field Dmrs-TypeA-Position, 1 bit of the field controlResourceSetZero, 4 bits of the field searchSpaceZero, 1 bit of the field CellBarred, 1 bit of the field intraFreqResel, 1 bit of the field Reserve bits, 1 bit of the field BCCH type, 2 bits of the field physical payload reserved bits, and 1 bit of the field physical payload subcarrier offset may not be useful for sidelink communications. In some examples, 1 bit of the field physical payload may be used to indicate synchronization signal block index. Additionally or alternatively, time division duplex configuration and in-coverage indicator may be included in sidelink communications. In some examples, a payload associated with a physical broadcast channel included in the synchronization signal block may include one or more bits associated with time division duplex indicator and one or more bits associated with coverage indication. In Frequency Range 1 (FR1) that includes sub-6 GHz frequency, 11 bit included in the master information block and the field BCCH type and 2 bit included in the field PBCH physical payload may be reused for time division duplex configuration and in-coverage indicator. In some examples, 13 unused bits of the physical broadcast channel (as shown in Table 1) may be reinterpreted in sidelink communications. In some examples, 12 bits may be used for time division duplex configuration and 1 bit may be used for in-coverage indicator. In some examples, a payload for a physical sidelink broadcast channel may be designed according to Table 2:

TABLE 2

| PSBCH contents | Number of bits |
| --- | --- |
| DFN | 10 |
| Indication of TDD configuration | [12] |
| Slot index | 7 |
| In-coverage indicator | 1 |
| Reserve bits | 2 |
| CRC | 24 |
| Total bits | 56 |

Figure 3:
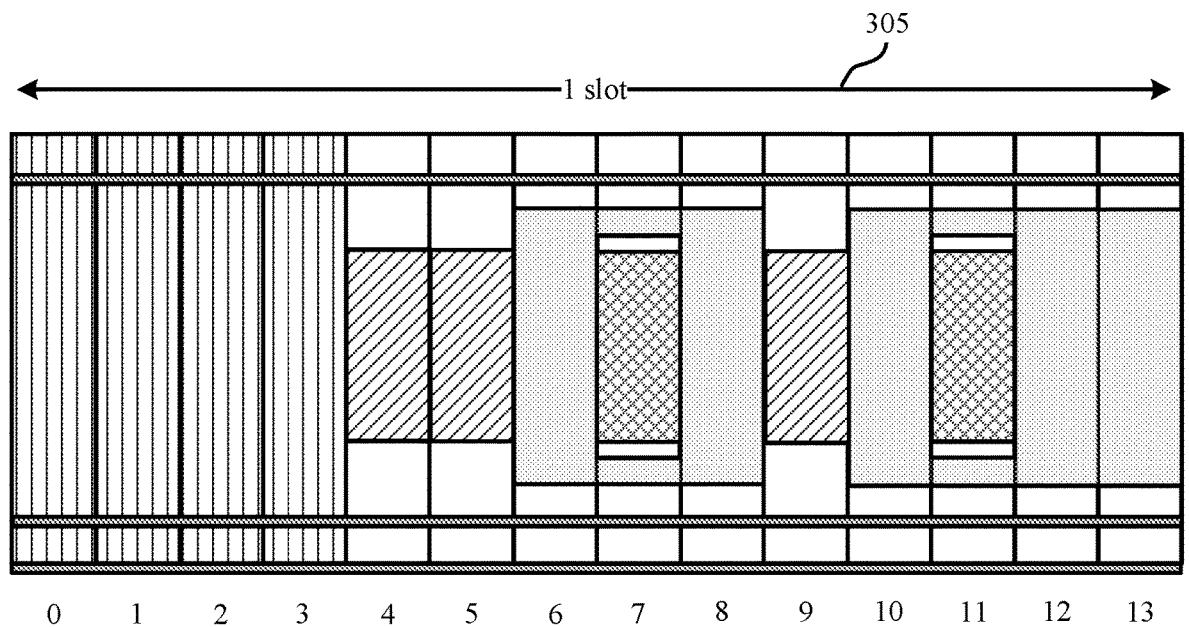
FIG. 3 illustrates an example of a configuration that supports techniques for synchronization signal block waveform design for sidelink communications in accordance with aspects of the present disclosure.
Figure 3:
Figure 3:
Figure 3:
Figure 3:

FIG. 3 illustrates an example of a configuration 300 that supports techniques for synchronization signal block waveform design for sidelink communications in accordance with aspects of the present disclosure. In some examples, the configuration 300 may implement aspects of wireless communications system 100 as described with reference to FIG. 1 and the wireless communications system 200 as described with reference to FIG. 2. The configuration 300 may be an example of a configuration supporting an updated synchronization signal block waveform design. In the example of FIG. 3, the configuration 300 illustrates procedures for communicating according to the updated synchronization signal block waveform design to facilitate efficient sidelink communication between UEs, which may be examples of the corresponding devices as described with reference to FIG. 1.

According to one or more aspects of the present disclosure, a first UE (e.g., transmitting UE) may determine that the first UE is scheduled to transmit a control signal and a synchronization signal associated with a synchronization signal block. For instance, the first UE may determine a schedule for transmitting a control signal and one or more signals associated with a synchronization block in a time period 305. As described herein, the time period 305 may be an example of a time slot, sub-slot, mini-slot, or the like. As depicted in the example of FIG. 3, the configuration 300 may include multiple symbols in a slot. In some examples, the slot includes 14 symbols (symbol 0 through symbol 13). In some cases, the first UE may identify that the control signal is mapped to a first set of symbols including a first symbol, a second symbol, and a third symbol. As depicted in the example of FIG. 3, a physical sidelink control channel may be mapped to symbol 1, symbol 2, and symbol 3 of the time slot 305 (symbol 0 includes a repetition of physical sidelink control channel). The first UE may transmit, to a second UE (e.g., receiving UE) during a first set of symbols (e.g., symbol 0, symbol 1, symbol 2, and symbol 3) within a time period (e.g., time slot 305), the control signal associated with a sidelink communication. A first synchronization signal block in the time slot 305 is mapped to symbol 5, symbol 6, symbol 7, and symbol 8 and a second synchronization signal block in the time slot 305 is mapped to symbol 9, symbol 10, symbol 11, and symbol 12. In the first synchronization signal block, a primary synchronization signal is mapped to symbol 5, a secondary synchronization signal is mapped to symbol 7 and a physical broadcast channel is mapped to symbol 6, symbol 7 and symbol 8. In the second synchronization signal block, a primary synchronization signal is mapped to symbol 9, a secondary synchronization signal is mapped to symbol 11 and a physical broadcast channel is mapped to symbol 10, symbol 11 and symbol 12. Symbol 13 is a gap for retuning if it is the last slot of the synchronization signal burst. Alternatively, if there is a synchronization signal block in a following slot, symbol 13 may be padded with a repetition physical broadcast channel symbol.

To maintain phase continuity, the first UE may transmit a synchronization signal associated with a synchronization signal block during a symbol subsequent to the first set of symbols (e.g., symbol 0, symbol 1, and symbol 2). As described in the example of FIG. 3, the first UE may map or otherwise identify a mapping of a primary synchronization signal on symbol 4 of time slot 305. For example, a primary synchronization signal may be repeated at symbol 4 and symbol 5. That is, the first UE may transmit a repetition of primary synchronization signal to avoid transmission gap after transmitting physical sidelink control channel. In some examples, a UE (e.g., receiver UE) may use symbol 4 (or symbols 3 and 4 where control channel is mapped to symbol 1 and symbol 2) for automatic gain control training.

Although not depicted in the example of FIG. 3, the first UE may transmit the control signal (e.g., physical sidelink control channel) mapped to symbol 1 and symbol 2 (instead of symbol 1, symbol 2, and symbol 3). In the example where the physical sidelink control channel occupies two symbols, the primary synchronization signal may be mapped to symbol 3 and symbol 4. That is, the first UE may transmit repetitions (or copies) of primary synchronization signal in symbol 3, symbol 4, and symbol 5. In some examples, transmitting a repetition of primary synchronization signal may increase complexity at a receiver UE (due to an increase in blind hypotheses of secondary synchronization signal location).

Figure 4:
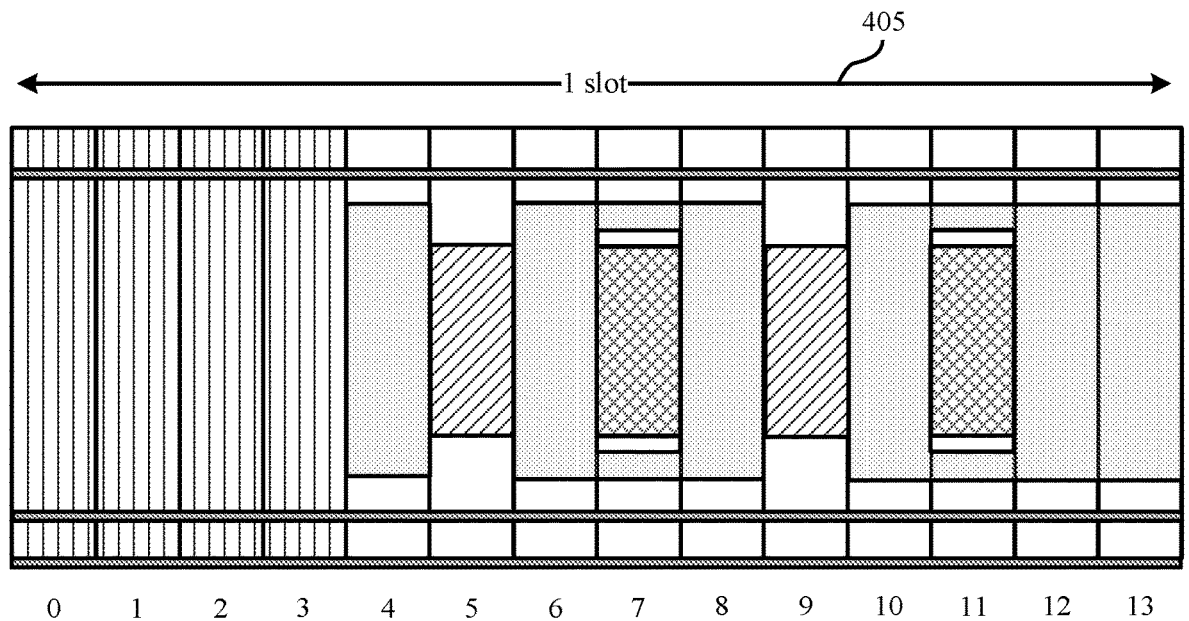
FIG. 4 illustrates an example of a configuration that supports techniques for synchronization signal block waveform design for sidelink communications in accordance with aspects of the present disclosure.

FIG. 4 illustrates an example of a configuration 400 that supports techniques for synchronization signal block waveform design for sidelink communications in accordance with aspects of the present disclosure. In some examples, the configuration 400 may implement aspects of wireless communications system 100 as described with reference to FIG. 1 and the wireless communications system 200 as described with reference to FIG. 2. The configuration 400 may be an example of a configuration supporting an updated synchronization signal block waveform design. In the example of FIG. 4, the configuration 400 illustrates procedures for communicating according to the updated synchronization signal block waveform design to facilitate efficient sidelink communication between UEs, which may be examples of the corresponding devices as described with reference to FIG. 1.

According to one or more aspects of the present disclosure, a first UE (e.g., transmitting UE) may determine that the first UE is scheduled to transmit a control signal and a synchronization signal associated with a synchronization signal block. For instance, the first UE may determine a schedule for transmitting a control signal and one or more signals associated with a synchronization block in a time period 405. As described herein, the time period 405 may be an example of a time slot, sub-slot, mini-slot, or the like. In the example of FIG. 4, the configuration 400 includes 14 symbols (symbol 0 through symbol 13) in time slot 405.

In some examples, the first UE may identify that the control signal is mapped to a first set of symbols. As depicted in the example of FIG. 4, a physical sidelink control channel may be mapped to symbol 0, symbol 1, and symbol 2 of the time slot 405. The first UE may transmit, to a second UE (e.g., receiving UE) during a first set of symbols (e.g., symbol 0, symbol 1, symbol 2, and symbol 3) within a time period (e.g., time slot 405), the control signal associated with a sidelink communication. As depicted in the example of FIG. 4, a first synchronization signal block in the time slot 405 is mapped to symbol 5, symbol 6, symbol 7, and symbol 8 and a second synchronization signal block in the time slot 405 is mapped to symbol 9, symbol 10, symbol 11, and symbol 12. In the first synchronization signal block, a primary synchronization signal is mapped to symbol 5, a secondary synchronization signal is mapped to symbol 7 and a physical broadcast channel is mapped to symbol 6, symbol 7 and symbol 8. In the second synchronization signal block, a primary synchronization signal is mapped to symbol 9, a secondary synchronization signal is mapped to symbol 11 and a physical broadcast channel is mapped to symbol 10, symbol 11 and symbol 12. Symbol 13 may be padded with a repetition physical broadcast channel symbol.

According to one or more aspects of the present disclosure, the first UE may transmit a synchronization signal associated with a synchronization signal block during a symbol subsequent to the first set of symbols (e.g., symbol 0, symbol 1, and symbol 2). As described in the example of FIG. 4, the first UE may map or otherwise identify a mapping of a physical broadcast channel on symbol 4 of time slot 405. In one example, a physical broadcast channel may be transmitted on symbol 4 followed by a primary synchronization signal on symbol 5. In some examples, a UE (e.g., receiver UE) may use symbol 4 (or symbols 3 and 4 where control channel is mapped to symbol 1 and symbol 2) for automatic gain control training.

Although not depicted in the example of FIG. 4, the first UE may transmit the control signal (e.g., physical sidelink control channel) mapped to symbol 1 and symbol 2 (instead of symbol 1, symbol 2, and symbol 3). In the example where the physical sidelink control channel occupies two symbols, the physical broadcast channel may be mapped to symbol 3 and symbol 4 (instead of only symbol 4). In some examples, transmitting a physical broadcast channel in the gap between the control signal and the synchronization signal block may not provide a decoding gain.

Figure 5:
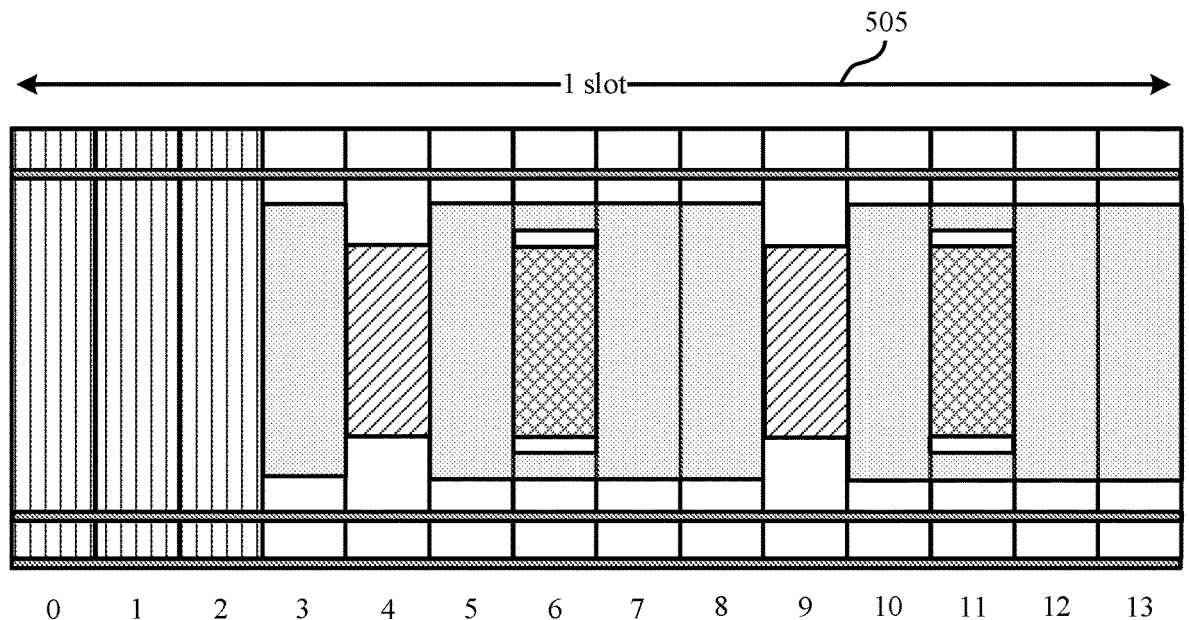
FIG. 5 illustrates an example of a configuration that supports techniques for synchronization signal block waveform design for sidelink communications in accordance with aspects of the present disclosure.
Figure 5:
Figure 5:
Figure 5:
Figure 5:

FIG. 5 illustrates an example of a configuration 500 that supports techniques for synchronization signal block waveform design for sidelink communications in accordance with aspects of the present disclosure. In some examples, the configuration 500 may implement aspects of wireless communications system 100 as described with reference to FIG.

1 and the wireless communications system 200 as described with reference to FIG. 2. The configuration 500 may be an example of a configuration supporting an updated synchronization signal block waveform design. In the example of FIG. 5, the configuration 500 illustrates procedures for communicating according to the updated synchronization signal block waveform design to facilitate efficient sidelink communication between UEs, which may be examples of the corresponding devices as described with reference to FIG. 1.

As described herein, the time period 505 may be an example of a time slot, sub-slot, mini-slot, or the like. The configuration 500 includes 14 symbols (symbol 0 through symbol 13) in time slot 505. In the example of FIG. 5, a physical sidelink control channel may be mapped to symbol 0 (repetition of physical sidelink control channel), symbol 1, and symbol 2 of the time slot 505. A transmitting UE may transmit, to a receiving UE during a first set of symbols (e.g., symbol 0, symbol 1, and symbol 2) within a time period (e.g., time slot 505), a control signal associated with a sidelink communication. As depicted in the example of FIG. 5, a first synchronization signal block in the time slot 505 is mapped to symbol 3, symbol 4, symbol 5, symbol 6 and symbol 7 and a second synchronization signal block in the time slot 505 is mapped to symbol 8, symbol 9, symbol 10, symbol 11 and symbol 12. In the first synchronization signal block, a primary synchronization signal is mapped to symbol 4, a secondary synchronization signal is mapped to symbol 6 and a physical broadcast channel is mapped to symbol 3, symbol 5, symbol 6, and symbol 7. In the second synchronization signal block, a primary synchronization signal is mapped to symbol 9, a secondary synchronization signal is mapped to symbol 11 and a physical broadcast channel is mapped to symbol 8, symbol 10, symbol 11 and symbol 12. Symbol 13 may be a gap symbol or may be padded with a repetition physical broadcast channel symbol. Additionally or alternatively, the transmitting UE may repeat a physical broadcast channel and physical sidelink shared channel or extended cyclic period from a slot following symbol 13 if there is a succeeding synchronization signal block transmission. In some examples, the physical sidelink shared channel may be restricted to two symbols.

According to one or more aspects of the present disclosure, the transmitting UE may transmit a control signal mapped to a first set of symbols (symbol 0, symbol 1 and symbol 2). The transmitting UE may rate match a signal associated with a physical broadcast channel to a second set of symbols including a third symbol subsequent to the first set of symbols within the time period 505. In the example of FIG. 5, the physical broadcast channel is rate matched to four symbols. In some examples, the physical broadcast channel may be rate matched on symbol 3, symbol 5, symbol 6, and symbol 7 in the first synchronization signal block or symbol 8, symbol 10, symbol 11 and symbol 12 in the second synchronization signal block.

Figure 6:
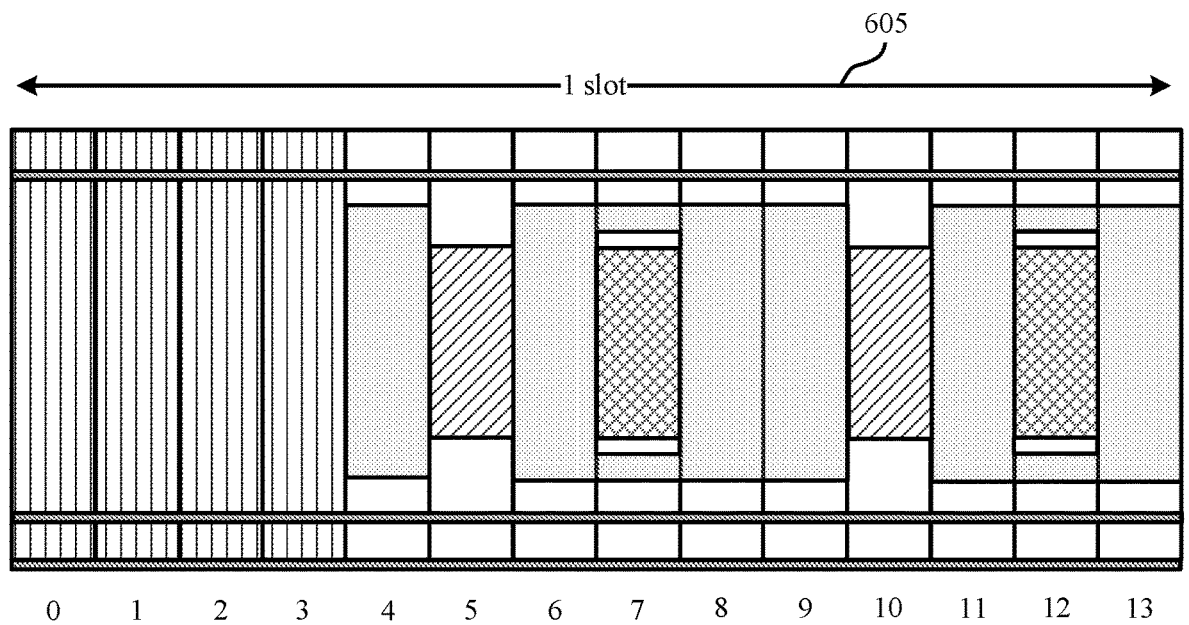
FIG. 6 illustrates an example of a configuration that supports techniques for synchronization signal block waveform design for sidelink communications in accordance with aspects of the present disclosure.

FIG. 6 illustrates an example of a configuration 600 that supports techniques for synchronization signal block waveform design for sidelink communications in accordance with aspects of the present disclosure. In some examples, the configuration 600 may implement aspects of wireless communications system 100 as described with reference to FIG. 1 and the wireless communications system 200 as described with reference to FIG. 2. The configuration 600 may be an example of a configuration supporting an updated synchronization signal block waveform design. In the example of FIG. 6, the configuration 600 illustrates procedures for communicating according to the updated synchronization signal block waveform design to facilitate efficient sidelink communication between UEs, which may be examples of the corresponding devices as described with reference to FIG. 1.

As described herein, the time period 605 may be an example of a time slot, sub-slot, mini-slot, or the like. The configuration 600 includes 14 symbols (symbol 0 through symbol 13) in time slot 605. In the example of FIG. 6, a physical sidelink control channel may be mapped to symbol 0 (repetition of physical sidelink control channel), symbol 1, symbol 2, and symbol 3 of the time slot 605. A transmitting UE may transmit, to a receiving UE during a first set of symbols (e.g., symbol 0, symbol 1, symbol 2, and symbol 3) within a time period (e.g., time slot 605), a control signal associated with a sidelink communication.

As depicted in the example of FIG. 6, a first synchronization signal block in the time slot 605 is mapped to symbol 4, symbol 5, symbol 6, symbol 7 and symbol 8 and a second synchronization signal block in the time slot 605 is mapped to symbol 9, symbol 10, symbol 11, symbol 12 and symbol 13. In the first synchronization signal block, a primary synchronization signal is mapped to symbol 5, a secondary synchronization signal is mapped to symbol 7 and a physical broadcast channel is mapped to symbol 4, symbol 6, symbol 7, and symbol 8. In the second synchronization signal block, a primary synchronization signal is mapped to symbol 10, a secondary synchronization signal is mapped to symbol 12 and a physical broadcast channel is mapped to symbol 9, symbol 11, symbol 12 and symbol 13. In some examples, the physical broadcast channel mapped to symbol 13 may be punctured in order to transmit a gap symbol. In some examples, the receiver UE may detect if symbol 13 is punctured when decoding the physical broadcast channel in the second synchronization signal block. In case where the control signal is mapped to two symbols (symbol 1 and symbol 2), the physical broadcast channel mapped to symbol 3 may not provide gain.

According to one or more aspects of the present disclosure, the transmitting UE may transmit a control signal mapped to a first set of symbols (symbol 0, symbol 1, symbol 2, and symbol 3). The transmitting UE may rate match a signal associated with a physical broadcast channel to a second set of symbols including a third symbol subsequent to the first set of symbols within the time period 605. In the example of FIG. 6, the physical broadcast channel is rate matched to four symbols. In some examples, the physical broadcast channel may be rate matched on symbol 4, symbol 6, symbol 7 and symbol 8 in the first synchronization signal block or symbol 9, symbol 11, symbol 12 and symbol 13 in the second synchronization signal block.

Figure 7:
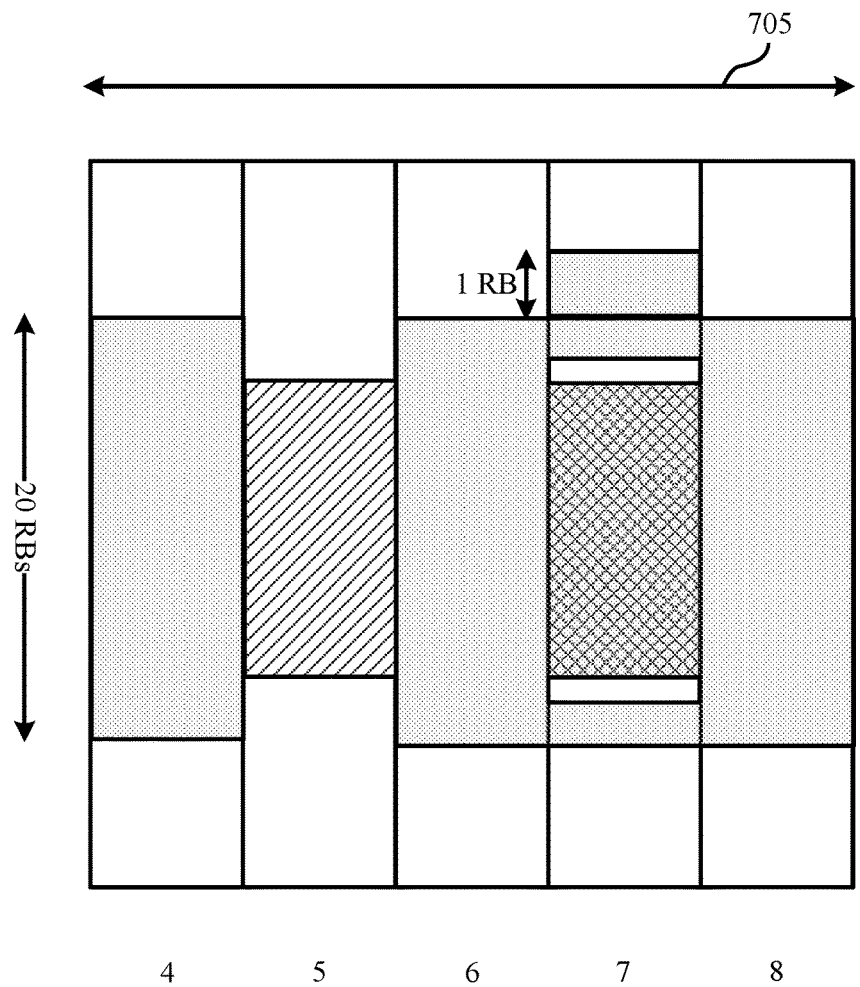
FIG. 7 illustrates an example of a configuration that supports techniques for synchronization signal block waveform design for sidelink communications in accordance with aspects of the present disclosure.

FIG. 7 illustrates an example of a configuration 700 that supports techniques for synchronization signal block waveform design for sidelink communications in accordance with aspects of the present disclosure. In some examples, the configuration 700 may implement aspects of wireless communications system 100 as described with reference to FIG. 1 and the wireless communications system 200 as described with reference to FIG. 2. The configuration 700 may be an example of a configuration supporting an updated synchronization signal block waveform design. In the example of FIG. 7, the configuration 700 illustrates procedures for communicating according to the updated synchronization signal block waveform design to facilitate efficient sidelink communication between UEs, which may be examples of the corresponding devices as described with reference to FIG. 1.

The configuration 700 includes a portion 705 of a time period as described with reference to FIGS. 3 through 6. As described herein, the time period may be an example of a time slot, sub-slot, mini-slot, or the like. The configuration 700 includes 5 symbols (symbol 4, symbol 5, symbol 6, symbol 7, and symbol 8) in the portion 705 of the time period. Although a portion 705 of a time slot is being depicted in FIG. 7, it may be understood that the time slot may include any number of symbols (e.g., 14 symbols). In some examples, FIG. 7 may describe a mapping of a synchronization signal block to symbol 4, symbol 5, symbol 6, symbol 7, and symbol 8. A transmitting UE may transmit, during a first set of symbols within a time period (e.g., time slot), a control signal associated with a sidelink communication.

As depicted in the example of FIG. 7, a physical broadcast channel is mapped to symbol 4, symbol 6, symbol 7, and symbol 8, a primary synchronization signal is mapped to symbol 5 and a secondary synchronization signal is mapped to symbol 7. According to one or more aspects, a physical broadcast channel may be is transmitted before or at or after the secondary synchronization signal symbols from a synchronizing UE node. The physical broadcast channel may span 20 resource blocks in frequency domain. In some examples, the symbol mapped to the secondary synchronization signal may include multiple empty resource elements (e.g., 17 resource elements) around the secondary synchronization signal. With equal power resource elements, a difference of 17 resource elements may result in a 7% power variation at the symbol mapped to the secondary synchronization signal (symbol 7). In such cases, the power variation may result in phase discontinuity in the three physical broadcast channel symbols (symbol 6, symbol 7, and symbol 8).

To efficiently handle the phase discontinuity of the physical broadcast channel mapped to symbol 6, symbol 7 and symbol 8, in one example, a receiving UE (UE receiving the configuration 700) may assume non-coherent demodulation reference signal on the multiple symbols mapped to a physical broadcast channel within a synchronization signal block. In some examples, the receiving UE may experience a loss in performance due to non-coherent channel estimation across multiple symbols mapped to the demodulation reference signal.

According to one or more aspects, the transmitting UE may transmit on additional resource blocks around the secondary synchronization signal (in symbol 7) to ensure the phase continuity. As depicted in the example of FIG. 7, the transmitting UE may transmit an additional resource block during the symbol mapped to the secondary synchronization signal (symbol 7). In some examples, the transmitting UE may transmit multiple additional resource blocks during the symbol mapped to the secondary synchronization signal (symbol 7). In some examples, the additional resource block may include a repetition of the physical broadcast channel. In some examples, symbol 7 including the additional resource block may be transmitted subsequent to symbol 6 mapped to a physical broadcast channel spanning 20 resource blocks. Transmission of the additional resource block in symbol 7 may avoid puncturing partial interlace physical sidelink shared channel into halves. Upon receiving the time period according to configuration 700, a receiver UE may identify that the phase continuity is maintained and may use coherent demodulation reference signal combining.

Figure 8:
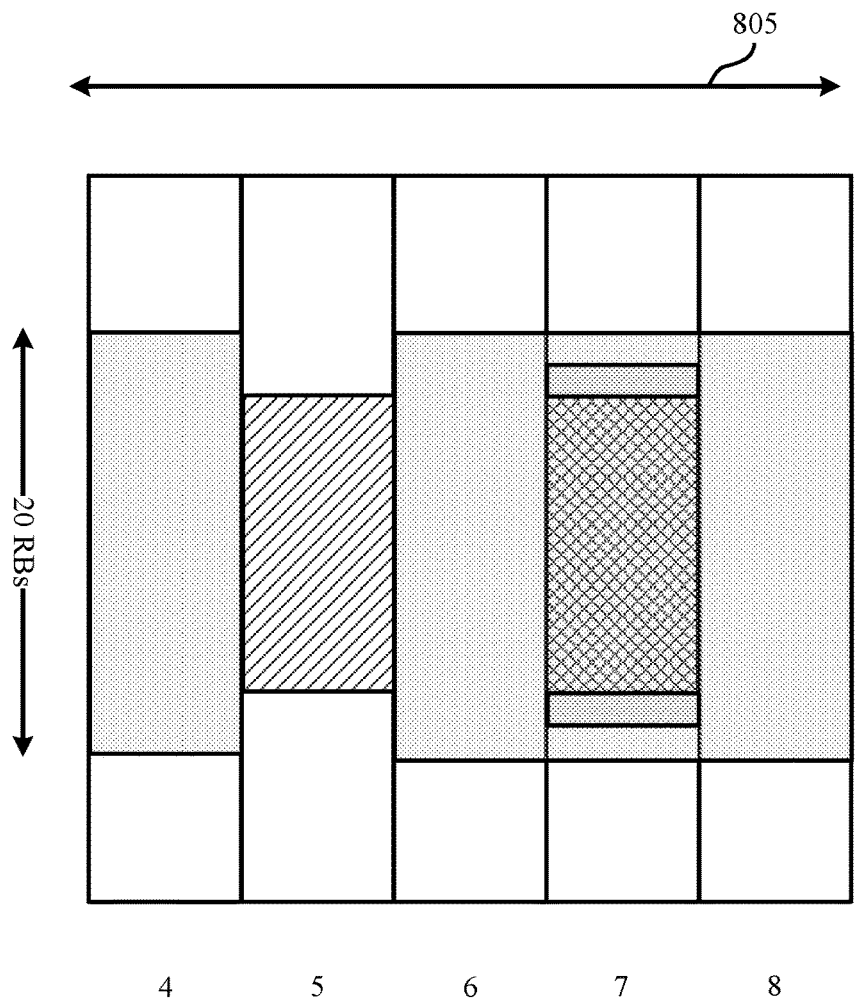
FIG. 8 illustrates an example of a configuration that supports techniques for synchronization signal block waveform design for sidelink communications in accordance with aspects of the present disclosure.

FIG. 8 illustrates an example of a configuration 800 that supports techniques for synchronization signal block waveform design for sidelink communications in accordance with aspects of the present disclosure. In some examples, the configuration 800 may implement aspects of wireless communications system 100 as described with reference to FIG. 1 and the wireless communications system 200 as described with reference to FIG. 2. The configuration 800 may be an example of a configuration supporting an updated synchronization signal block waveform design. In the example of FIG. 8, the configuration 800 illustrates procedures for communicating according to the updated synchronization signal block waveform design to facilitate efficient sidelink communication between UEs, which may be examples of the corresponding devices as described with reference to FIG. 1.

The configuration 800 includes a portion 805 of a time period as described with reference to FIGS. 3 through 6. As described herein, the time period may be an example of a time slot, sub-slot, mini-slot, or the like. The configuration 800 includes 5 symbols (symbol 4, symbol 5, symbol 6, symbol 7, and symbol 8) in the portion 805 of the time period. Although a portion 805 of a time slot is being depicted in FIG. 8, it may be understood that the time slot may include one or more additional symbols (e.g., a total of 14 symbols). In some examples, FIG. 8 may describe a mapping of a synchronization signal block to symbol 4, symbol 5, symbol 6, symbol 7, and symbol 8. A transmitting UE may transmit, during a first set of symbols within a time period (e.g., time slot), a control signal associated with a sidelink communication (not shown).

As depicted in the example of FIG. 8, a physical broadcast channel is mapped to symbol 4, symbol 6, symbol 7, and symbol 8, a primary synchronization signal is mapped to symbol 5 and a secondary synchronization signal is mapped to symbol 7. The physical broadcast channel may span 20 resource blocks in frequency domain. In some examples, the symbol mapped to the secondary synchronization signal may include multiple empty resource elements. The difference in occupancy of resource blocks in consecutive symbols may result in a phase discontinuity of the physical broadcast channel. According to one or more aspects, to efficiently handle the phase discontinuity of the physical broadcast channel, the transmitting UE may transmit additional demodulation reference signal and data associated with the physical broadcast channel on one or more empty resource elements during the symbol mapped to the secondary synchronization signal. In one example, the transmitting UE may identify one or more empty resource elements during the symbol mapped to the secondary synchronization signal.

As depicted in the example of FIG. 8, the transmitting UE may map the physical broadcast channel to one or more empty resource elements in symbol 7. In some examples, the transmitting UE may transmit the additional resource elements during the symbol mapped to the secondary synchronization signal (symbol 7). In some examples, the additional resource elements may include a repetition of the physical broadcast channel. In some examples, symbol 7 may include a total of 20 resource blocks (including the secondary synchronization signal and one or more resource elements mapped to the physical broadcast channel). Mapping of the physical broadcast channel to the one or more previously empty resource elements in symbol 7 may not affect the complexity as the physical broadcast channel is associated with an irregular pattern (e.g., 8 resource blocks with 3 physical broadcast channel symbols while the remaining 12 resource blocks with 2 physical broadcast channel symbols). Upon receiving the time period according to configuration 800, a receiver UE may receiver determine a method to use the additional physical broadcast channel resource elements. In some examples, there may not be a change on rate matching on one or more additional physical broadcast channel resource elements (other than the physical broadcast channel resource elements in symbol 7).

Figure 9:
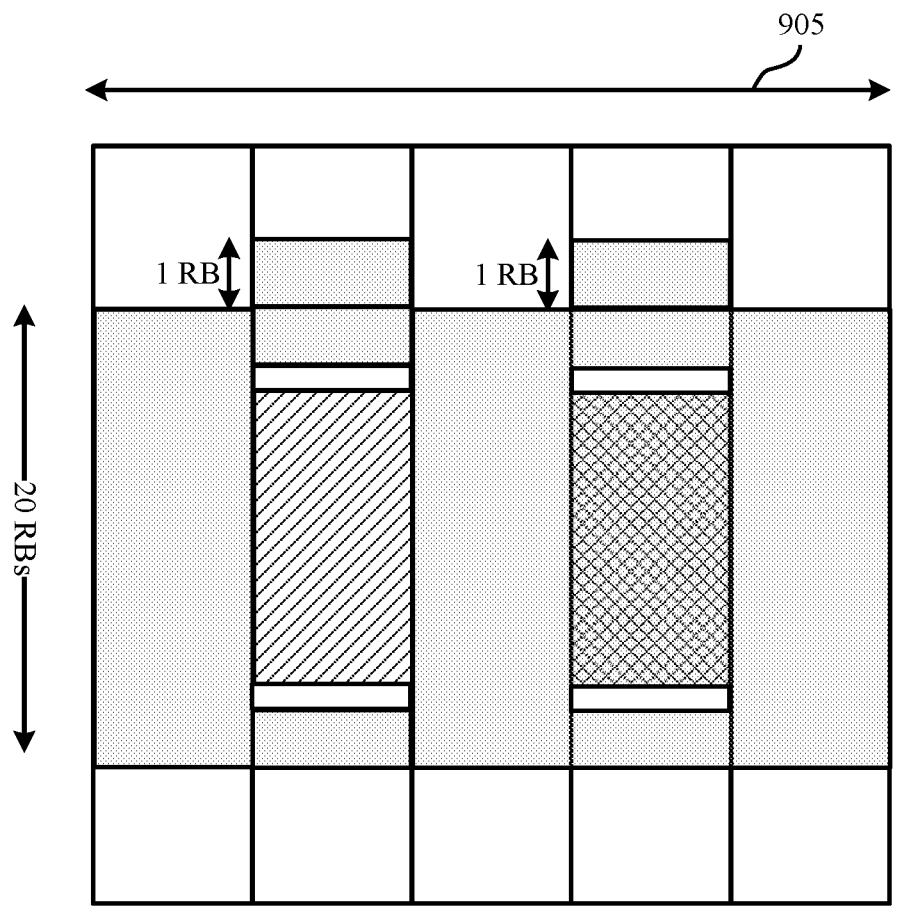
FIG. 9 illustrates an example of a configuration that supports techniques for synchronization signal block waveform design for sidelink communications in accordance with aspects of the present disclosure.

FIG. 9 illustrates an example of a configuration 900 that supports techniques for synchronization signal block waveform design for sidelink communications in accordance with aspects of the present disclosure. In some examples, the configuration 900 may implement aspects of wireless communications system 100 as described with reference to FIG. 1 and the wireless communications system 200 as described with reference to FIG. 2. The configuration 900 may be an example of a configuration supporting an updated synchronization signal block waveform design. In the example of FIG. 9, the configuration 900 illustrates procedures for communicating according to the updated synchronization signal block waveform design to facilitate efficient sidelink communication between UEs, which may be examples of the corresponding devices as described with reference to FIG. 1.

The configuration 900 includes a portion 905 of a time period as described with reference to FIGS. 3 through 6. As described herein, the time period may be an example of a time slot, sub-slot, mini-slot, or the like. The configuration 900 includes 5 symbols (symbol 4, symbol 5, symbol 6, symbol 7, and symbol 8) in the portion 905 of the time period. Although a portion 905 of a time slot is being depicted in FIG. 9, it may be understood that the time slot may include any number of symbols (e.g., 14 symbols). In some examples, FIG. 9 may describe a mapping of a synchronization signal block to symbol 4, symbol 5, symbol 6, symbol 7, and symbol 8. According to one or more aspects of the present disclosure, a transmitting UE may transmit, during a first set of symbols within a time period (e.g., time slot), a control signal associated with a sidelink communication (not shown).

As depicted in the example of FIG. 9, a physical broadcast channel is mapped to symbol 4, symbol 6, symbol 7, and symbol 8, a primary synchronization signal is mapped to symbol 5 and a secondary synchronization signal is mapped to symbol 7. In some examples, the primary synchronization signal may occupy 127 tones and the symbols mapped to the physical broadcast channel may occupy 240 tones (20 resource blocks). In one example of Unlicensed National Information Infrastructure band, a power spectral density limit may be 10 dBm/MHz. In such cases, power boosting of the primary synchronization signal may not be allowed when the physical broadcast channel is transmitted at a maximum energy per resource element allowed according to the power spectral density limit. For example, the physical broadcast channel may be transmitted at an energy per resource element value of −5.2288 dBm and a total transmit power may be 18.5733 dBm. In such an example, the primary synchronization signal may not transmit using more than an energy per resource element value of −5.2288 dBm and a total transmit power of 15.81 dBm. In some examples, where a primary synchronization signal may not be power boosted to match the power of the symbol mapped to the physical broadcast channel, it may be difficult to maintain physical broadcast channel or physical sidelink control channel phase continuity across primary synchronization signal. As described herein, the physical broadcast channel may be rate matched to the symbol(s) preceding the primary synchronization signal. Additionally or alternatively, a physical sidelink control channel and a synchronization signal block may be multiplexed in the same slot.

To efficiently handle the phase discontinuity, in one example, a transmitting UE (UE transmitting the configuration 900) may reduce a maximum energy per resource element value of the physical broadcast channel with a margin to the power spectral density limit (not shown). Additionally or alternatively, the transmitting UE may power boost the primary synchronization signal such that the primary synchronization signal and the physical broadcast channel has similar transmit power. In one example, the transmitting UE may determine a first energy per resource element associated with a physical broadcast channel in symbol 4 and a second energy per resource element associated with a primary synchronization signal in symbol 5. The transmitting UE may transmit a signal (in symbol 4) associated with the physical broadcast channel using a third energy per resource element less than the first energy per resource element. Additionally or alternatively, the transmitting UE may transmit the primary synchronization signal (in symbol 5) using a fourth energy per resource element greater than the second energy per resource element. For example, the transmitting UE may reduce a maximum energy per resource element associated with the physical broadcast channel to −7.99 dBm. In such a case, the maximum transmit power may be 15.81 dBm. The transmitting UE may additionally power boost the primary synchronization signal by 2.7641 dB such that a value of the energy per resource element is −5.2288 dBm (within the power spectral density limit) and a value of the transmit power is 15.81 dBm. In such an example, altering the values of the energy per resource element may result in reduced physical broadcast channel coverage.

In one example, a receiving UE (UE receiving the configuration 900) may assume non-coherent demodulation reference signal on the multiple symbols mapped to the physical broadcast channel within the synchronization signal block. However, assuming non-coherent demodulation reference signal may result in a performance loss due to non-coherent channel estimation across demodulation reference signal symbols. Additionally, assumption of non-coherent demodulation reference signal may fail to address the phase discontinuity of physical sidelink shared channel across one or more symbols mapped to the primary synchronization signal.

According to one or more aspects, the transmitting UE may transmit additional resource blocks around the primary synchronization signal (in symbol 5) to ensure the phase continuity. Additionally or alternatively, the transmitting UE may transmit on additional resource blocks around the secondary synchronization signal (in symbol 7) to ensure the phase continuity. As depicted in the example of FIG. 9, the transmitting UE may transmit one or more additional resource blocks (e.g., 9-10 resource blocks) during the symbol mapped to the primary synchronization signal (symbol 5) and one or more additional resource blocks during the symbol mapped to the secondary synchronization signal (symbol 7). In some examples, the additional resource block may include a repetition of the physical broadcast channel. As described herein, the physical broadcast channel in symbol 4 may span 20 resource blocks. The transmitter UE may be able to transmit 8 additional resource blocks (including physical broadcast channel repetitions) within the synchronization signal block region spanning 20 resource blocks while leaving 17 resource elements as the guard tone above/below the primary synchronization signal tones in symbol 5. Similarly, transmitting 8 additional resource blocks (including physical broadcast channel repetitions) within the synchronization signal block region spanning 20 resource blocks may leave 17 resource elements as the guard tone above/below the secondary synchronization signal tones in symbol 7. As depicted in the example of FIG. 9, the transmitter UE may transmit one or more resource blocks (e.g., 1-2) including physical broadcast channel repetitions outside but consecutive to the 20 resource block region within the portion 905. Upon receiving the time period according to configuration 900, a receiver UE may identify that the phase continuity is maintained and may use coherent demodulation reference signal combining.

Figure 10:
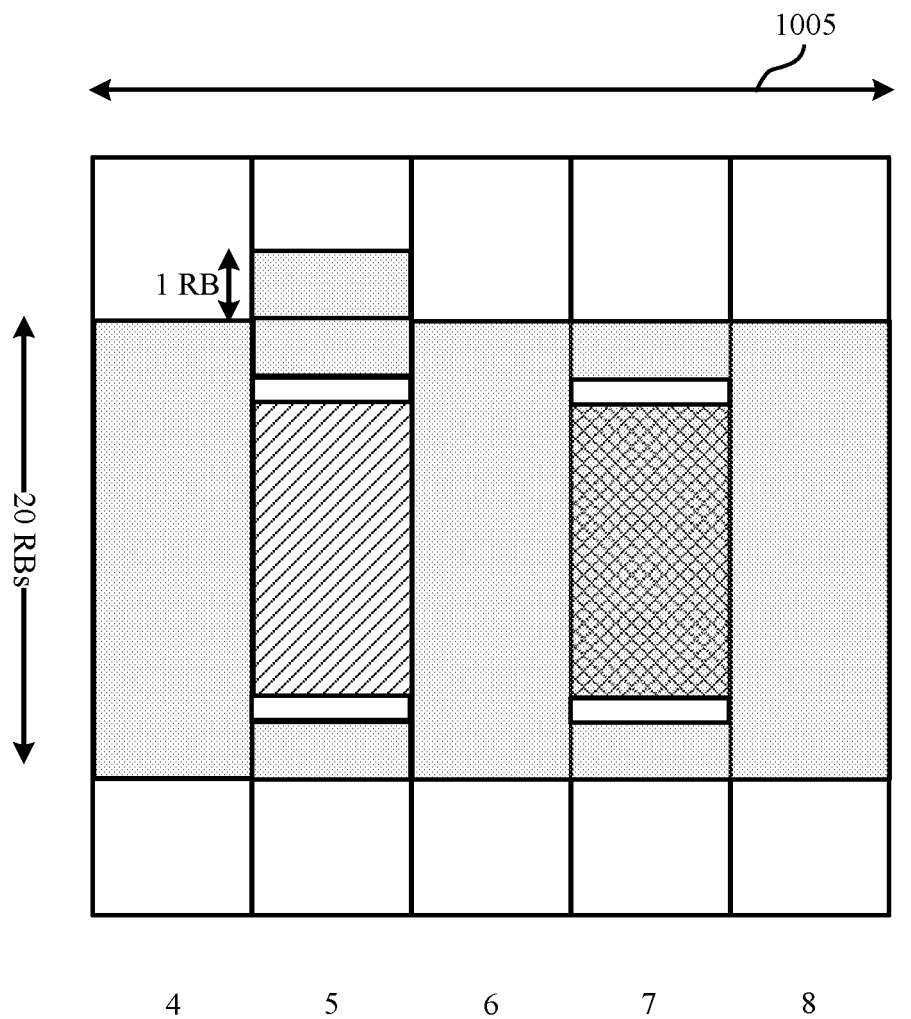
FIG. 10 illustrates an example of a configuration that supports techniques for synchronization signal block waveform design for sidelink communications in accordance with aspects of the present disclosure.

FIG. 10 illustrates an example of a configuration 1000 that supports techniques for synchronization signal block waveform design for sidelink communications in accordance with aspects of the present disclosure. In some examples, the configuration 900 may implement aspects of wireless communications system 100 as described with reference to FIG. 1 and the wireless communications system 200 as described with reference to FIG. 2. The configuration 1000 may be an example of a configuration supporting an updated synchronization signal block waveform design. In the example of FIG. 10, the configuration 1000 illustrates procedures for communicating according to the updated synchronization signal block waveform design to facilitate efficient sidelink communication between UEs, which may be examples of the corresponding devices as described with reference to FIG. 1.

The configuration 1000 includes a portion 1005 of a time period as described with reference to FIGS. 3 through 6. As described herein, the time period may be an example of a time slot, sub-slot, mini-slot, or the like. The configuration 1000 includes 5 symbols (symbol 4, symbol 5, symbol 6, symbol 7, and symbol 8) in the portion 1005 of the time period. Although a portion 1005 of a time slot is being depicted in FIG. 10, it may be understood that the time slot may include any number of symbols (e.g., 14 symbols). In some examples, FIG. 10 may describe a mapping of a synchronization signal block to symbol 4, symbol 5, symbol 6, symbol 7, and symbol 8. According to one or more aspects of the present disclosure, a transmitting UE may transmit, during a first set of symbols within a time period (e.g., time slot), a control signal associated with a sidelink communication (not shown).

As depicted in the example of FIG. 10, a physical broadcast channel is mapped to symbol 4, symbol 6, symbol 7, and symbol 8, a primary synchronization signal is mapped to symbol 5 and a secondary synchronization signal is mapped to symbol 7. According to one or more aspects, the transmitting UE may transmit additional resource blocks around the primary synchronization signal (in symbol 5) to ensure the phase continuity. As described herein, the physical broadcast channel in symbol 4 may span 20 resource blocks. In some examples, the additional resource block may include a repetition of the physical broadcast channel, In some examples, the transmitting UE may transmit one or more additional resource blocks (e.g., 9-10 resource blocks) during the symbol mapped to the primary synchronization signal (symbol 5) such that one or more resource blocks are transmitted outside but consecutive to the 20 resource block region within the portion 1005. The transmitter UE may additionally perform physical broadcast channel rate matching on the additional resource blocks (in symbol 5) in addition to the physical broadcast channel rate matching on symbol 4.

Figure 11:
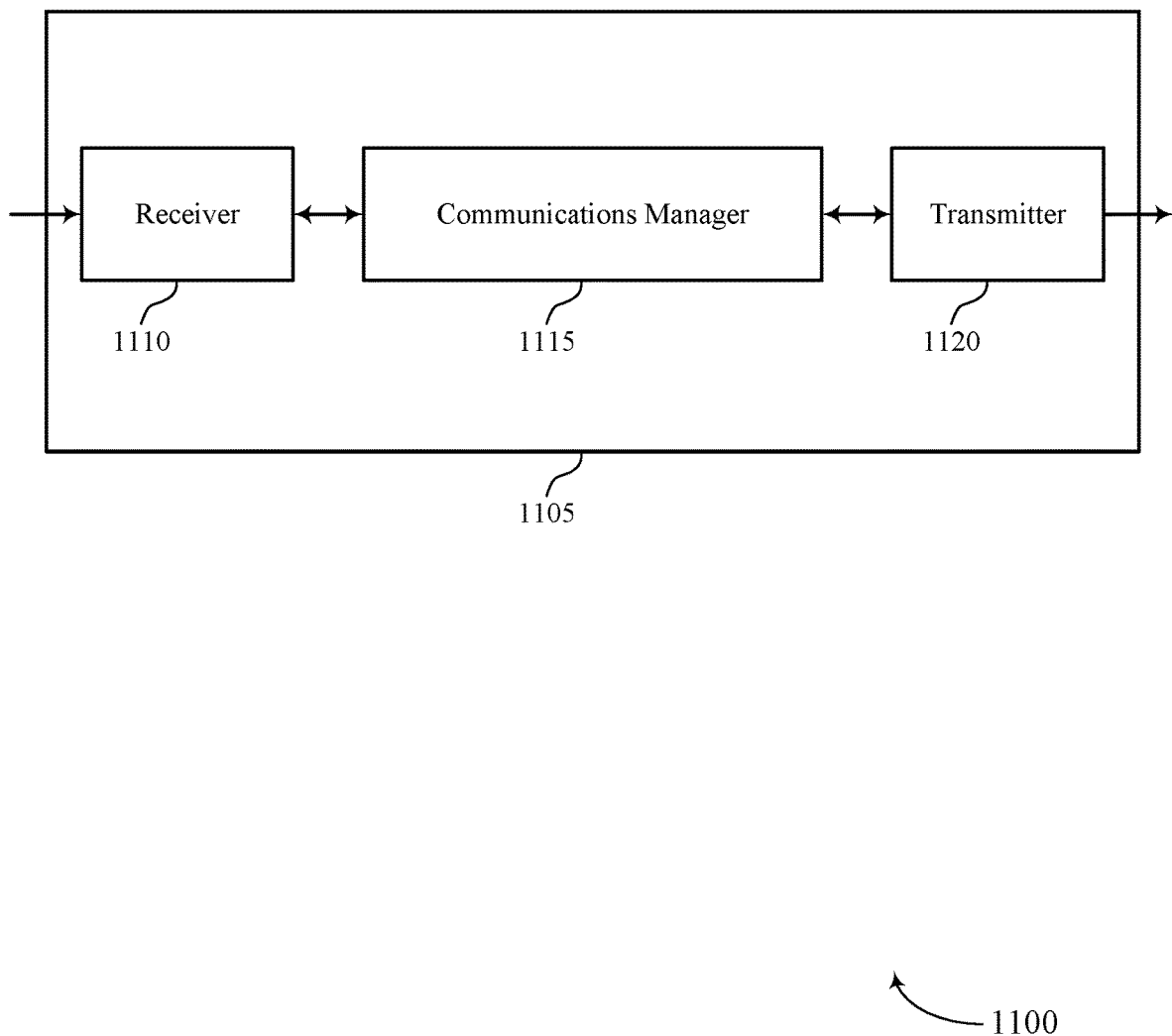
FIGS. 11 and 12 show block diagrams of devices that support techniques for synchronization signal block waveform design for sidelink communications in accordance with aspects of the present disclosure.

FIG. 11 shows a block diagram 1100 of a device 1105 that supports techniques for synchronization signal block waveform design for sidelink communications in accordance with aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for synchronization signal block waveform design for sidelink communications, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may determine that the first UE is scheduled to transmit a control signal and a synchronization signal associated with a synchronization signal block, transmit, to a second UE during a first set of symbols within a time period, the control signal associated with a sidelink communication, transmit, to the second UE during a symbol subsequent to the first set of symbols, the synchronization signal associated with the synchronization signal block, and communicate with the second UE according to the transmitted control signal and the transmitted synchronization signal. The communications manager 1115 may also receive, from a second UE during a first set of symbols within a time period, a control signal associated with a sidelink communication, receive, from the second UE during a symbol subsequent to the first set of symbols, a synchronization signal associated with a synchronization signal block, and communicate with the second UE according to the received control signal and the received synchronization signal. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
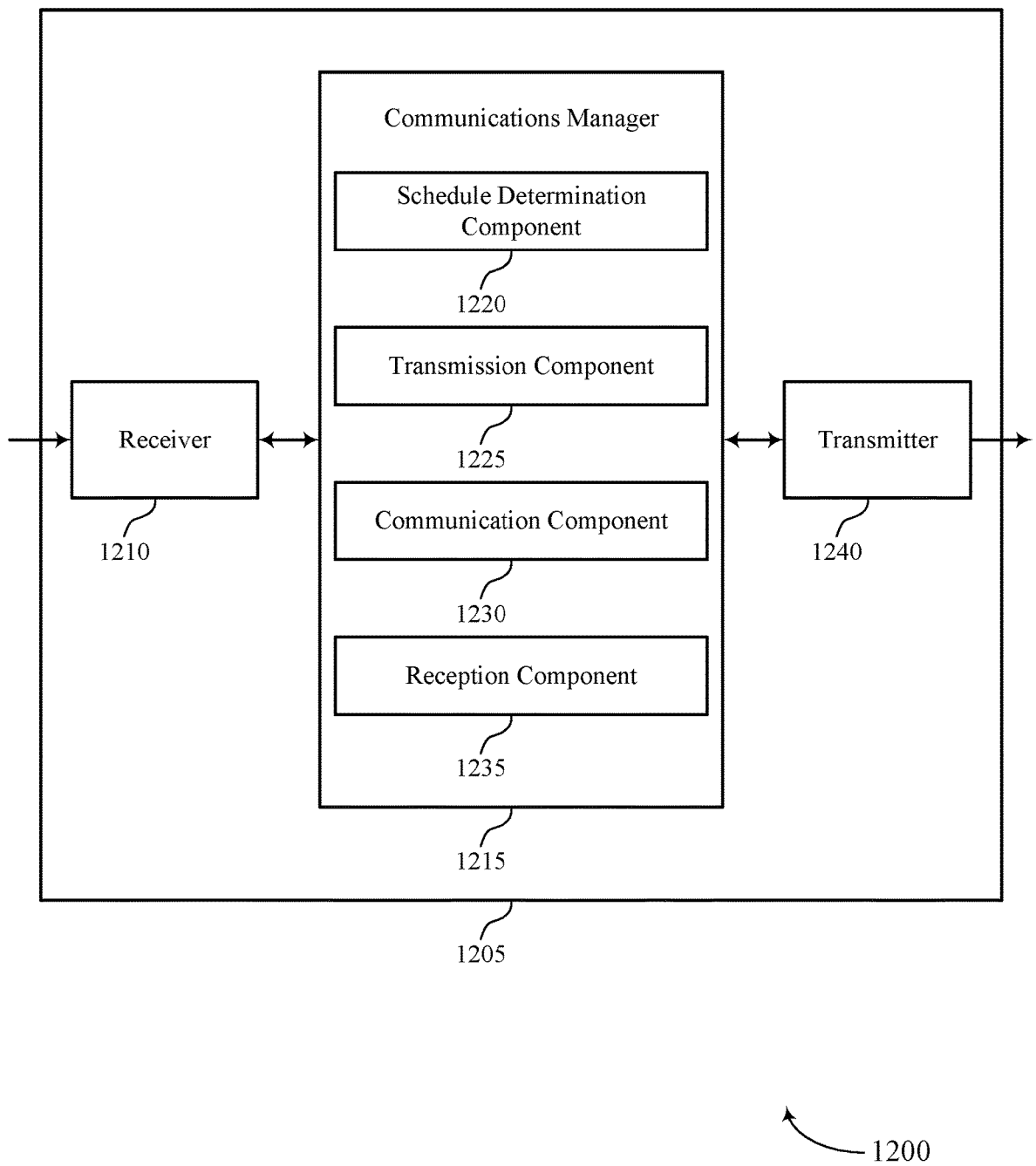

FIG. 12 shows a block diagram 1200 of a device 1205 that supports techniques for synchronization signal block waveform design for sidelink communications in accordance with aspects of the present disclosure. The device 1205 may be an example of aspects of a device 1105, or a UE 115 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for synchronization signal block waveform design for sidelink communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a schedule determination component 1220, a transmission component 1225, a communication component 1230, and a reception component 1235. The communications manager 1215 may be an example of aspects of the communications manager 1410 described herein.

The schedule determination component 1220 may determine that the first UE is scheduled to transmit a control signal and a synchronization signal associated with a synchronization signal block. The transmission component 1225 may transmit, to a second UE during a first set of symbols within a time period, the control signal associated with a sidelink communication and transmit, to the second UE during a symbol subsequent to the first set of symbols, the synchronization signal associated with the synchronization signal block. The communication component 1230 may communicate with the second UE according to the transmitted control signal and the transmitted synchronization signal.

The reception component 1235 may receive, from a second UE during a first set of symbols within a time period, a control signal associated with a sidelink communication and receive, from the second UE during a symbol subsequent to the first set of symbols, a synchronization signal associated with a synchronization signal block. The communication component 1230 may communicate with the second UE according to the received control signal and the received synchronization signal.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
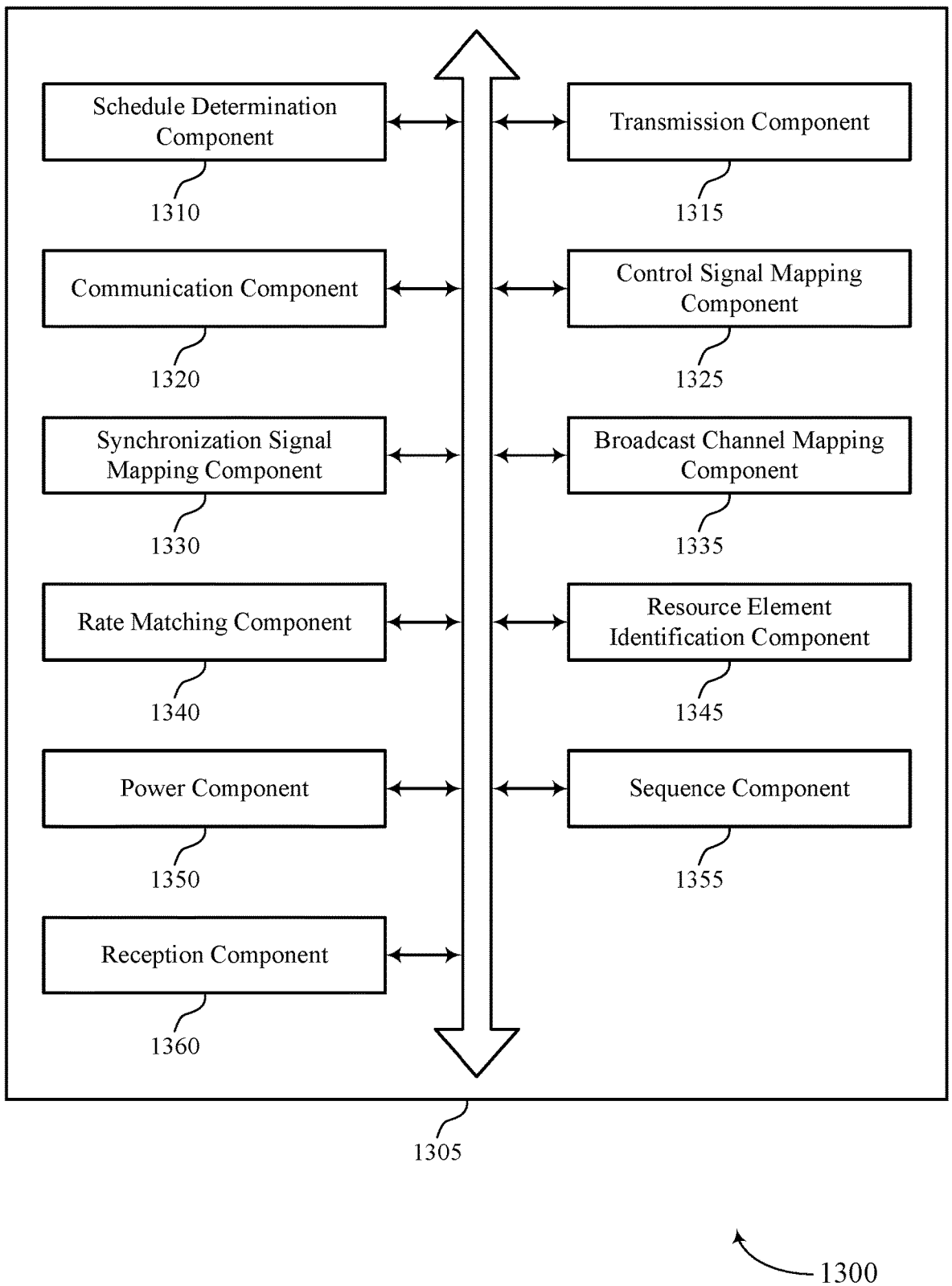
FIG. 13 shows a block diagram of a communications manager that supports techniques for synchronization signal block waveform design for sidelink communications in accordance with aspects of the present disclosure.

FIG. 13 shows a block diagram 1300 of a communications manager 1305 that supports techniques for synchronization signal block waveform design for sidelink communications in accordance with aspects of the present disclosure. The communications manager 1305 may be an example of aspects of a communications manager 1115, a communications manager 1215, or a communications manager 1410 described herein. The communications manager 1305 may include a schedule determination component 1310, a transmission component 1315, a communication component 1320, a control signal mapping component 1325, a synchronization signal mapping component 1330, a broadcast channel mapping component 1335, a rate matching component 1340, a resource element identification component 1345, a power component 1350, a sequence component 1355, and a reception component 1360. Each of these modules may communicate, directly or indirectly, with one another (e.g., via one or more buses).

The schedule determination component 1310 may determine that the first UE is scheduled to transmit a control signal and a synchronization signal associated with a synchronization signal block. In some cases, a payload associated with a physical broadcast channel included in the synchronization signal block includes one or more bits associated with time division duplex indicator and one or more bits associated with coverage indication. In some cases, the control signal includes a physical sidelink control channel.

The transmission component 1315 may transmit, to a second UE during a first set of symbols within a time period, the control signal associated with a sidelink communication. In some examples, the transmission component 1315 may transmit, to the second UE during a symbol subsequent to the first set of symbols, the synchronization signal associated with the synchronization signal block. The communication component 1320 may communicate with the second UE according to the transmitted control signal and the transmitted synchronization signal.

The control signal mapping component 1325 may identify that the control signal is mapped to the first set of symbols including a first symbol and a second symbol. The synchronization signal mapping component 1330 may identify that a primary synchronization signal is mapped to a second set of symbols subsequent to the first set of symbols within the time period, the second set of symbols including a third symbol, a fourth symbol, and a fifth symbol, where transmitting the synchronization signal during the symbol includes transmitting the primary synchronization signal during the third symbol.

In some examples, the control signal mapping component 1325 may identify that the control signal is mapped to the first set of symbols including a first symbol, a second symbol and a third symbol. In some examples, the synchronization signal mapping component 1330 may identify that a primary synchronization signal is mapped to a second set of symbols subsequent to the first set of symbols within the time period, the second set of symbols including a fourth symbol, and a fifth symbol, where transmitting the synchronization signal during the symbol includes transmitting the primary synchronization signal during the fourth symbol.

In some examples, the control signal mapping component 1325 may identify that the control signal is mapped to the first set of symbols including a first symbol and a second symbol. The broadcast channel mapping component 1335 may identify that a signal associated with a physical broadcast channel is mapped to a second set of symbols subsequent to the first set of symbols within the time period, the second set of symbols including a third symbol and a fourth symbol, where transmitting the synchronization signal during the symbol includes transmitting the signal associated with the physical broadcast channel during the third symbol.

In some examples, the control signal mapping component 1325 may identify that the control signal is mapped to the first set of symbols including a first symbol, a second symbol and a third symbol. In some examples, the broadcast channel mapping component 1335 may identify that a signal associated with a physical broadcast channel is mapped to a fourth symbol subsequent to the first set of symbols within the time period, where transmitting the synchronization signal during the symbol includes transmitting the signal associated with the physical broadcast channel during the fourth symbol.

In some examples, the transmission component 1315 may transmit, to the second UE during a fifth symbol subsequent to the fourth symbol, a primary synchronization signal. In some examples, the transmission component 1315 may transmit, to the second UE during a sixth symbol subsequent to the fifth symbol, a repetition of the signal associated with a physical broadcast channel.

In some examples, the control signal mapping component 1325 may identify that the control signal is mapped to the first set of symbols including a first symbol and a second symbol. The rate matching component 1340 may rate match a signal associated with a physical broadcast channel to a second set of symbols including a third symbol subsequent to the first set of symbols within the time period, where transmitting the synchronization signal during the symbol includes transmitting the signal associated with the physical broadcast channel during the third symbol.

In some examples, the transmission component 1315 may transmit, to the second UE during a third set of symbols, a first set of synchronization signals associated with the synchronization signal block, where the second set of symbols is a subset of the third set of symbols. In some examples, the transmission component 1315 may transmit, to the second UE during a fourth set of symbols subsequent to the third set of symbols, a second set of synchronization signals associated with a second synchronization signal block.

In some cases, a second symbol subsequent to the fourth set of symbols within the time period includes a repetition of a signal associated with a second physical broadcast channel included in the second synchronization signal block. In some cases, a second symbol subsequent to the fourth set of symbols within the time period includes a gap symbol.

In some examples, the control signal mapping component 1325 may identify that the control signal is mapped to the first set of symbols including a first symbol, a second symbol and a third symbol. In some examples, the rate matching component 1340 may rate match a signal associated with a physical broadcast channel to a second set of symbols including a fourth symbol subsequent to the first set of symbols within the time period, where transmitting the synchronization signal during the symbol includes transmitting the signal associated with the physical broadcast channel during the fourth symbol.

In some examples, the synchronization signal mapping component 1330 may identify that the synchronization signal block is mapped to a second set of symbols subsequent to the first set of symbols, the synchronization signal block including a primary synchronization signal, a secondary synchronization signal and a physical broadcast channel. In some examples, the synchronization signal mapping component 1330 may determine that a first set of resource blocks is mapped to the secondary synchronization signal and a second set of resource blocks is mapped to the physical broadcast channel in a first symbol included in the second set of symbols.

In some examples, the transmission component 1315 may transmit, during the first symbol, the first set of resource blocks mapped to the secondary synchronization signal, the second set of resource blocks is mapped to the physical broadcast channel and one or more additional resource blocks mapped to the physical broadcast channel.

The resource element identification component 1345 may identify one or more empty resource elements consecutive to the first set of resource blocks mapped to the secondary synchronization signal. In some examples, the broadcast channel mapping component 1335 may map the physical broadcast channel to the one or more empty resource elements in the first symbol. In some examples, the transmission component 1315 may transmit, during the first symbol, the first set of resource blocks mapped to the secondary synchronization signal, the second set of resource blocks is mapped to the physical broadcast channel and the one or more mapped resource elements. In some cases, a sum of the first set of resource blocks, the second set of resource blocks and the one or more mapped resource elements include a total number of resource blocks mapped to the physical broadcast channel in a second symbol consecutive to the first symbol.

In some examples, the synchronization signal mapping component 1330 may determine that a first set of resource blocks is mapped to the primary synchronization signal in a first symbol included in the second set of symbols. In some examples, the transmission component 1315 may transmit, during the first symbol, the first set of resource blocks mapped to the primary synchronization signal and a second set of resource blocks is mapped to the physical broadcast channel. In some examples, the rate matching component 1340 may rate match a signal associated with the physical broadcast channel on the second set of resource blocks.

The power component 1350 may determine a first energy per resource element associated with a physical broadcast channel and a second energy per resource element associated with a primary synchronization signal, where the synchronization signal block includes the primary synchronization signal, a secondary synchronization signal and the physical broadcast channel.

In some examples, the transmission component 1315 may transmit, during a first symbol, a signal associated with the physical broadcast channel using a third energy per resource element, where the third energy per resource element is less than the first energy per resource element. In some examples, the transmission component 1315 may transmit, during a second symbol subsequent to the first symbol, the primary synchronization signal using a fourth energy per resource element, where the fourth energy per resource element is greater than the second energy per resource element.

In some examples, the synchronization signal mapping component 1330 may identify that the synchronization signal block is mapped to a second set of symbols subsequent to the first set of symbols within the time period. In some examples, the synchronization signal mapping component 1330 may identify that a second synchronization signal block is mapped to a third set of symbols subsequent to the second set of symbols within the time period. In some examples, the transmission component 1315 may transmit, to the second UE during the third set of symbols, a set of synchronization signals associated with the second synchronization signal block.

The sequence component 1355 may identify a sequence. In some cases, a sequence for a primary synchronization signal associated with a direct interface is same as the sequence for the primary synchronization signal associated with a network interface. In some cases, a sequence for a secondary synchronization signal associated with a direct interface is same as the sequence for the secondary synchronization signal associated with a network interface. In some cases, a sequence for a primary synchronization signal includes a binary phase shift keying sequence.

In some examples, the transmission component 1315 may transmit, during a first symbol, a secondary synchronization signal included in the synchronization signal block. In some examples, the transmission component 1315 may transmit, during a second symbol after the first symbol, a primary synchronization signal included in the synchronization signal block.

In some cases, a payload associated with a physical broadcast channel included in the synchronization signal block includes one or more bits associated with time division duplex indicator and one or more bits associated with coverage indication. In some cases, the control signal includes a physical sidelink control channel. In some cases, the synchronization signal block is multiplexed with a physical sidelink shared channel. In some cases, the time period includes a time slot.

The reception component 1360 may receive, from a second UE during a first set of symbols within a time period, a control signal associated with a sidelink communication. In some examples, the reception component 1360 may receive, from the second UE during a symbol subsequent to the first set of symbols, a synchronization signal associated with a synchronization signal block. The communication component 1320 may communicate with the second UE according to the received control signal and the received synchronization signal.

The control signal mapping component 1325 may identify that the control signal is mapped to the first set of symbols including a first symbol and a second symbol. The synchronization signal mapping component 1330 may identify that a primary synchronization signal is mapped to a second set of symbols subsequent to the first set of symbols within the time period, the second set of symbols including a third symbol, a fourth symbol, and a fifth symbol, where receiving the synchronization signal during the symbol includes receiving the primary synchronization signal during the third symbol.

In some examples, the control signal mapping component 1325 may identify that the control signal is mapped to the first set of symbols including a first symbol, a second symbol and a third symbol. In some examples, the synchronization signal mapping component 1330 may identify that a primary synchronization signal is mapped to a second set of symbols subsequent to the first set of symbols within the time period, the second set of symbols including a fourth symbol, and a fifth symbol, where receiving the synchronization signal during the symbol includes receiving the primary synchronization signal during the fourth symbol.

In some examples, the control signal mapping component 1325 may identify that the control signal is mapped to the first set of symbols including a first symbol and a second symbol. The broadcast channel mapping component 1335 may identify that a signal associated with a physical broadcast channel is mapped to a second set of symbols subsequent to the first set of symbols within the time period, the second set of symbols including a third symbol and a fourth symbol, where receiving the synchronization signal during the symbol includes receiving the signal associated with the physical broadcast channel during the third symbol.

In some examples, the control signal mapping component 1325 may identify that the control signal is mapped to the first set of symbols including a first symbol, a second symbol and a third symbol. In some examples, the broadcast channel mapping component 1335 may identify that a signal associated with a physical broadcast channel is mapped to a fourth symbol subsequent to the first set of symbols within the time period, where receiving the synchronization signal during the symbol includes receiving the signal associated with the physical broadcast channel during the fourth symbol.

In some examples, the reception component 1360 may receive, from the second UE during a fifth symbol subsequent to the fourth symbol, a primary synchronization signal. In some examples, the reception component 1360 may receive, from the second UE during a sixth symbol subsequent to the fifth symbol, a repetition of the signal associated with a physical broadcast channel.

In some examples, the control signal mapping component 1325 may identify that the control signal is mapped to the first set of symbols including a first symbol and a second symbol, where a signal associated with a physical broadcast channel is rate matched to a second set of symbols including a third symbol subsequent to the first set of symbols within the time period, and where receiving the synchronization signal during the symbol includes receiving the signal associated with the physical broadcast channel during the third symbol.

In some examples, the reception component 1360 may receive, from the second UE during a third set of symbols, a first set of synchronization signals associated with the synchronization signal block, where the second set of symbols is a subset of the third set of symbols. In some examples, the reception component 1360 may receive, from the second UE during a fourth set of symbols subsequent to the third set of symbols, a second set of synchronization signals associated with a second synchronization signal block.

In some cases, a second symbol subsequent to the fourth set of symbols within the time period includes a repetition of a signal associated with a second physical broadcast channel included in the second synchronization signal block. In some cases, a second symbol subsequent to the fourth set of symbols within the time period includes a gap symbol. In some cases, the second set of symbols includes four symbols.

In some examples, the control signal mapping component 1325 may identify that the control signal is mapped to the first set of symbols including a first symbol, a second symbol and a third symbol, where a signal associated with a physical broadcast channel is rate matched to a second set of symbols including a fourth symbol subsequent to the first set of symbols within the time period, and where transmitting the synchronization signal during the symbol includes transmitting the signal associated with the physical broadcast channel during the fourth symbol.

In some examples, the synchronization signal mapping component 1330 may identify that the synchronization signal block is mapped to a second set of symbols subsequent to the first set of symbols, the synchronization signal block including a primary synchronization signal, a secondary synchronization signal and a physical broadcast channel. In some examples, the synchronization signal mapping component 1330 may determine that a first set of resource blocks is mapped to the secondary synchronization signal and a second set of resource blocks is mapped to the physical broadcast channel in a first symbol included in the second set of symbols.

In some examples, the reception component 1360 may receive, during the first symbol, the first set of resource blocks mapped to the secondary synchronization signal, the second set of resource blocks is mapped to the physical broadcast channel and one or more additional resource blocks mapped to the physical broadcast channel.

In some examples, the reception component 1360 may receive, during the first symbol, the first set of resource blocks mapped to the secondary synchronization signal, the second set of resource blocks is mapped to the physical broadcast channel and the one or more empty resource elements mapped to the physical broadcast channel, where the or more empty resource elements are consecutive to the first set of resource blocks mapped to the secondary synchronization signal.

In some cases, a sum of the first set of resource blocks, the second set of resource blocks and the one or more mapped resource elements include a total number of resource blocks mapped to the physical broadcast channel in a second symbol consecutive to the first symbol. In some cases, the synchronization signal block is multiplexed with a physical sidelink shared channel. In some cases, the time period includes a time slot.

In some examples, the synchronization signal mapping component 1330 may determine that a first set of resource blocks is mapped to the primary synchronization signal in a first symbol included in the second set of symbols. In some examples, the synchronization signal mapping component 1330 may receive, during the first symbol, the first set of resource blocks mapped to the primary synchronization signal and a second set of resource blocks is mapped to the physical broadcast channel. In some cases, a signal associated with the physical broadcast channel is rate matched on the second set of resource blocks.

In some examples, the synchronization signal mapping component 1330 may identify that the synchronization signal block is mapped to a second set of symbols subsequent to the first set of symbols within the time period. In some examples, the synchronization signal mapping component 1330 may identify that a second synchronization signal block is mapped to a third set of symbols subsequent to the second set of symbols within the time period. In some examples, the reception component 1360 may receive, from the second UE during the third set of symbols, a set of synchronization signals associated with the second synchronization signal block. In some examples, the reception component 1360 may receive, during a first symbol, a secondary synchronization signal included in the synchronization signal block.

In some examples, the reception component 1360 may receive, during a second symbol after the first symbol, a primary synchronization signal included in the synchronization signal block. In some cases, the second set of symbols includes four symbols.

In some cases, a sequence for a primary synchronization signal associated with a direct interface is same as the sequence for the primary synchronization signal associated with a network interface. In some cases, a sequence for a secondary synchronization signal associated with a direct interface is same as the sequence for the secondary synchronization signal associated with a network interface. In some cases, a sequence for a primary synchronization signal includes a binary phase shift keying sequence.

Figure 14:
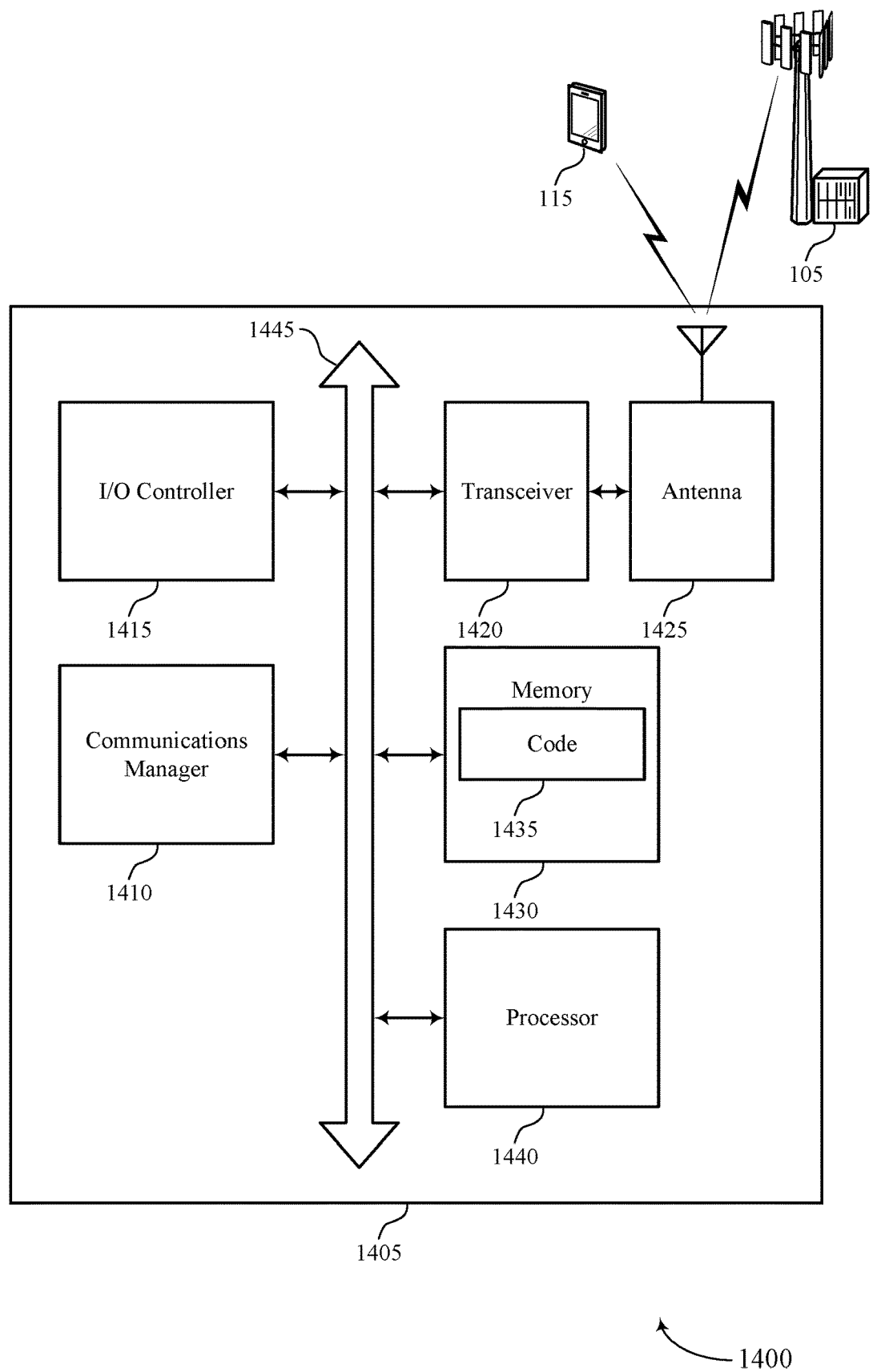
FIG. 14 shows a diagram of a system including a device that supports techniques for synchronization signal block waveform design for sidelink communications in accordance with aspects of the present disclosure.

FIG. 14 shows a diagram of a system 1400 including a device 1405 that supports techniques for synchronization signal block waveform design for sidelink communications in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may determine that the first UE is scheduled to transmit a control signal and a synchronization signal associated with a synchronization signal block, transmit, to a second UE during a first set of symbols within a time period, the control signal associated with a sidelink communication, transmit, to the second UE during a symbol subsequent to the first set of symbols, the synchronization signal associated with the synchronization signal block, and communicate with the second UE according to the transmitted control signal and the transmitted synchronization signal. The communications manager 1410 may also receive, from a second UE during a first set of symbols within a time period, a control signal associated with a sidelink communication, receive, from the second UE during a symbol subsequent to the first set of symbols, a synchronization signal associated with a synchronization signal block, and communicate with the second UE according to the received control signal and the received synchronization signal.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include random-access memory (RAM) and read-only memory (ROM). The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for synchronization signal block waveform design for sidelink communications).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
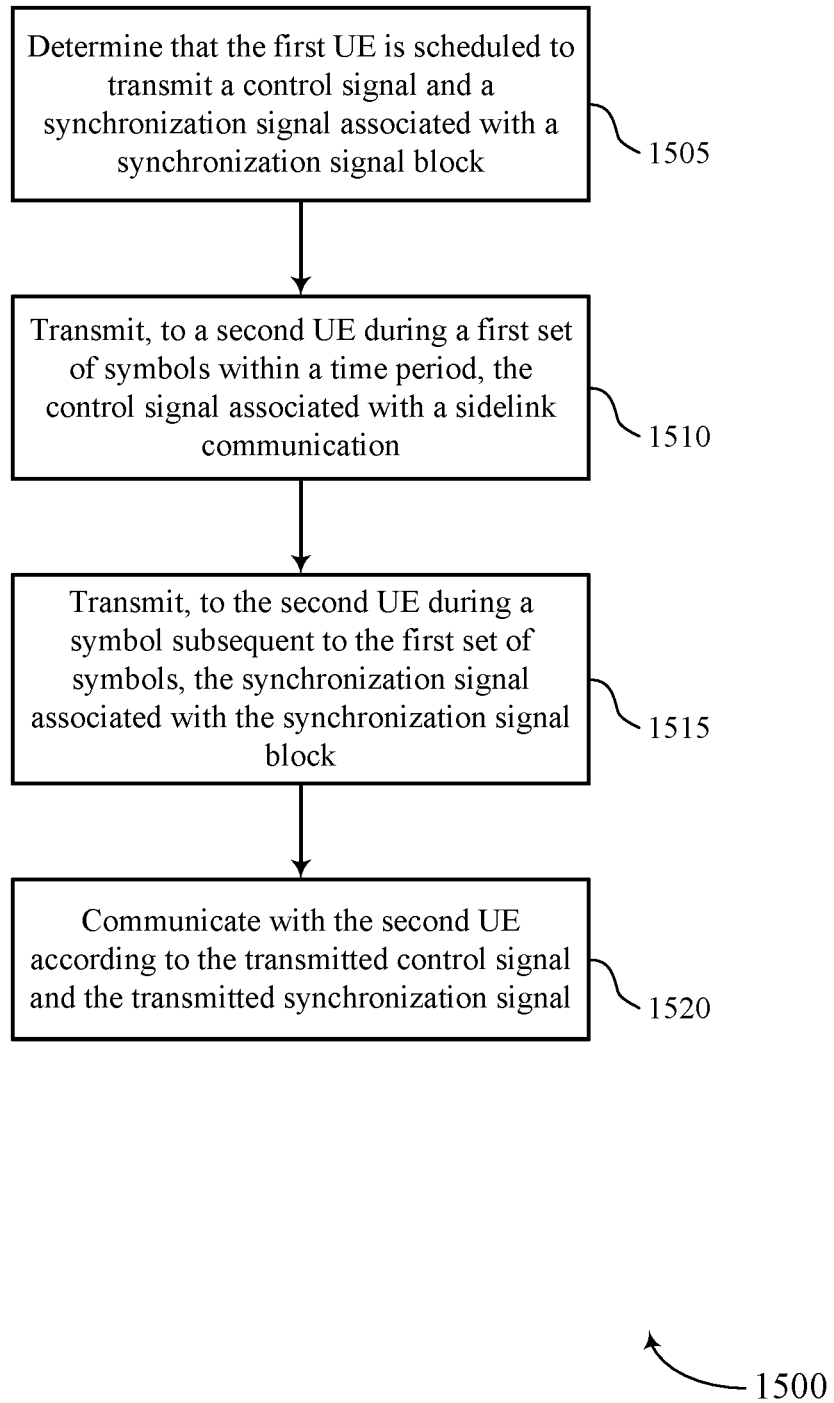
FIGS. 15 through 18 show flowcharts illustrating methods that support techniques for synchronization signal block waveform design for sidelink communications in accordance with aspects of the present disclosure.

FIG. 15 shows a flowchart illustrating a method 1500 that supports techniques for synchronization signal block waveform design for sidelink communications in accordance with aspects of the present disclosure. The operations of method 1500 may be implemented by a UE 115 or its components as described herein. For example, the operations of method 1500 may be performed by a communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 1505, the UE may determine that the first UE is scheduled to transmit a control signal and a synchronization signal associated with a synchronization signal block. The operations of 1505 may be performed according to the methods described herein. In some examples, aspects of the operations of 1505 may be performed by a schedule determination component as described with reference to FIGS. 11 through 14.

At 1510, the UE may transmit, to a second UE during a first set of symbols within a time period, the control signal associated with a sidelink communication. The operations of 1510 may be performed according to the methods described herein. In some examples, aspects of the operations of 1510 may be performed by a transmission component as described with reference to FIGS. 11 through 14.

At 1515, the UE may transmit, to the second UE during a symbol subsequent to the first set of symbols, the synchronization signal associated with the synchronization signal block. The operations of 1515 may be performed according to the methods described herein. In some examples, aspects of the operations of 1515 may be performed by a transmission component as described with reference to FIGS. 11 through 14.

At 1520, the UE may communicate with the second UE according to the transmitted control signal and the transmitted synchronization signal. The operations of 1520 may be performed according to the methods described herein. In some examples, aspects of the operations of 1520 may be performed by a communication component as described with reference to FIGS. 11 through 14.

Figure 16:
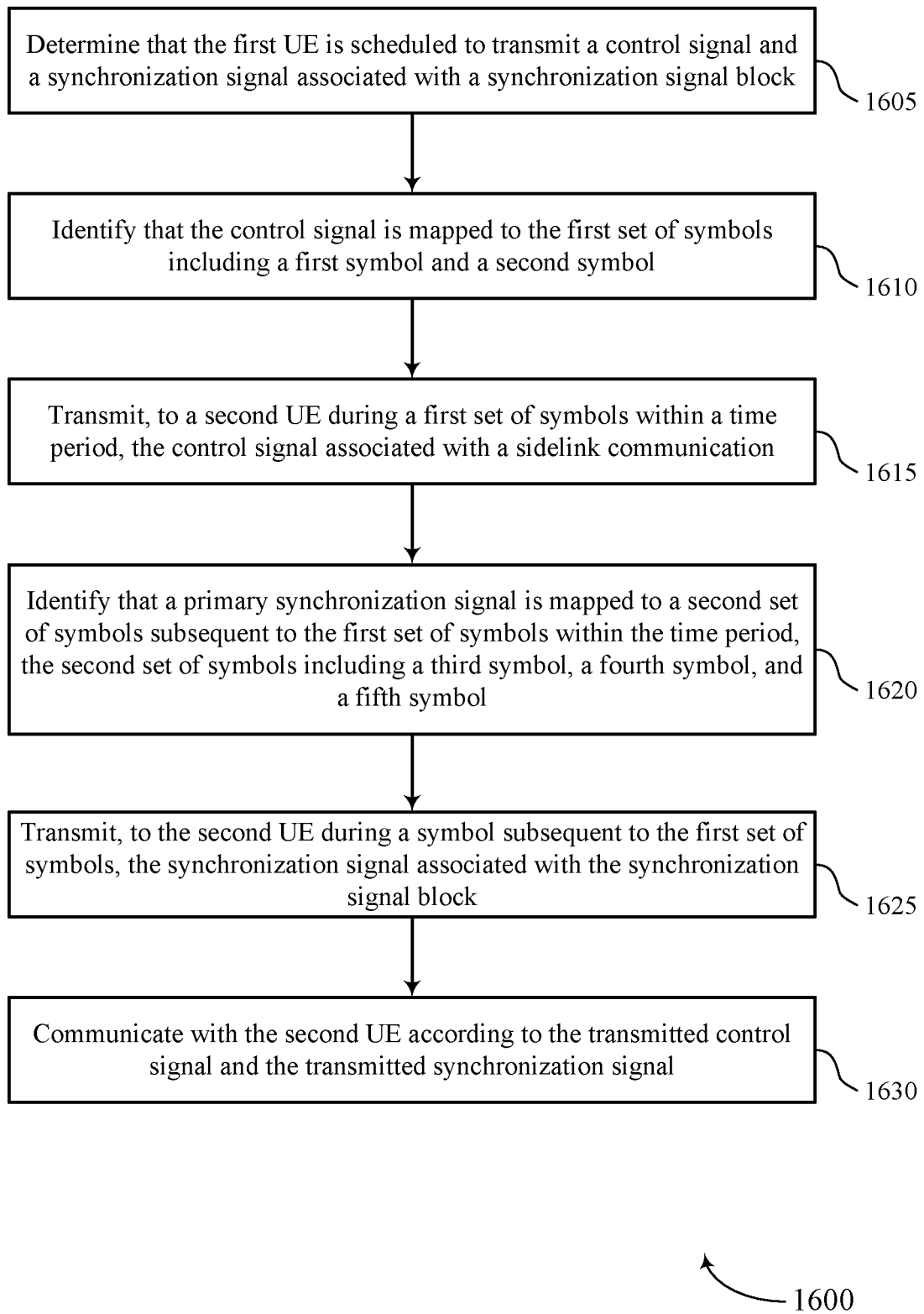

FIG. 16 shows a flowchart illustrating a method 1600 that supports techniques for synchronization signal block waveform design for sidelink communications in accordance with aspects of the present disclosure. The operations of method 1600 may be implemented by a UE 115 or its components as described herein. For example, the operations of method 1600 may be performed by a communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 1605, the UE may determine that the first UE is scheduled to transmit a control signal and a synchronization signal associated with a synchronization signal block. The operations of 1605 may be performed according to the methods described herein. In some examples, aspects of the operations of 1605 may be performed by a schedule determination component as described with reference to FIGS. 11 through 14.

At 1610, the UE may identify that the control signal is mapped to the first set of symbols including a first symbol and a second symbol. The operations of 1610 may be performed according to the methods described herein. In some examples, aspects of the operations of 1610 may be performed by a control signal mapping component as described with reference to FIGS. 11 through 14.

At 1615, the UE may transmit, to a second UE during a first set of symbols within a time period, the control signal associated with a sidelink communication. The operations of 1615 may be performed according to the methods described herein. In some examples, aspects of the operations of 1615 may be performed by a transmission component as described with reference to FIGS. 11 through 14.

At 1620, the UE may identify that a primary synchronization signal is mapped to a second set of symbols subsequent to the first set of symbols within the time period, the second set of symbols including a third symbol, a fourth symbol, and a fifth symbol. The operations of 1620 may be performed according to the methods described herein. In some examples, aspects of the operations of 1620 may be performed by a synchronization signal mapping component as described with reference to FIGS. 11 through 14.

At 1625, the UE may transmit, to the second UE during a symbol subsequent to the first set of symbols, the synchronization signal associated with the synchronization signal block. In some cases, transmitting the synchronization signal during the symbol includes transmitting the primary synchronization signal during the third symbol. The operations of 1625 may be performed according to the methods described herein. In some examples, aspects of the operations of 1625 may be performed by a transmission component as described with reference to FIGS. 11 through 14.

At 1630, the UE may communicate with the second UE according to the transmitted control signal and the transmitted synchronization signal. The operations of 1630 may be performed according to the methods described herein. In some examples, aspects of the operations of 1630 may be performed by a communication component as described with reference to FIGS. 11 through 14.

Figure 17:
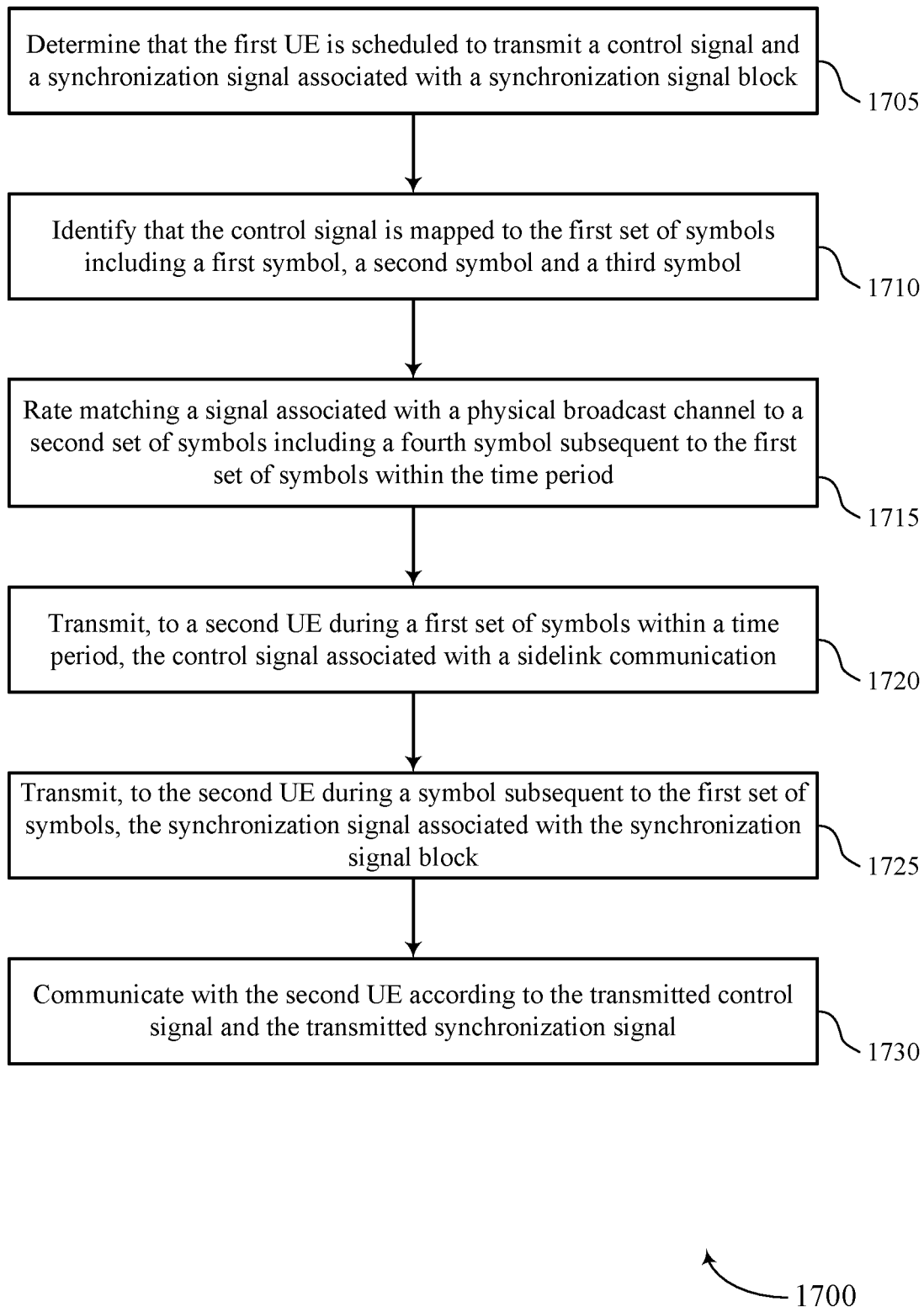

FIG. 17 shows a flowchart illustrating a method 1700 that supports techniques for synchronization signal block waveform design for sidelink communications in accordance with aspects of the present disclosure. The operations of method 1700 may be implemented by a UE 115 or its components as described herein. For example, the operations of method 1700 may be performed by a communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 1705, the UE may determine that the first UE is scheduled to transmit a control signal and a synchronization signal associated with a synchronization signal block. The operations of 1705 may be performed according to the methods described herein. In some examples, aspects of the operations of 1705 may be performed by a schedule determination component as described with reference to FIGS. 11 through 14.

At 1710, the UE may identify that the control signal is mapped to the first set of symbols including a first symbol, a second symbol and a third symbol. The operations of 1710 may be performed according to the methods described herein. In some examples, aspects of the operations of 1710 may be performed by a control signal mapping component as described with reference to FIGS. 11 through 14.

At 1715, the UE may rate matching a signal associated with a physical broadcast channel to a second set of symbols including a fourth symbol subsequent to the first set of symbols within the time period. The operations of 1715 may be performed according to the methods described herein. In some examples, aspects of the operations of 1715 may be performed by a rate matching component as described with reference to FIGS. 11 through 14.

At 1720, the UE may transmit, to a second UE during a first set of symbols within a time period, the control signal associated with a sidelink communication. The operations of 1720 may be performed according to the methods described herein. In some examples, aspects of the operations of 1720 may be performed by a transmission component as described with reference to FIGS. 11 through 14.

At 1725, the UE may transmit, to a second UE during a symbol subsequent to the first set of symbols, the synchronization signal associated with the synchronization signal block. In some cases, transmitting the synchronization signal during the symbol includes transmitting the signal associated with the physical broadcast channel during the fourth symbol. The operations of 1725 may be performed according to the methods described herein. In some examples, aspects of the operations of 1725 may be performed by a transmission component as described with reference to FIGS. 11 through 14.

At 1730, the UE may communicate with the second UE according to the transmitted control signal and the transmitted synchronization signal. The operations of 1730 may be performed according to the methods described herein. In some examples, aspects of the operations of 1730 may be performed by a communication component as described with reference to FIGS. 11 through 14.

Figure 18:
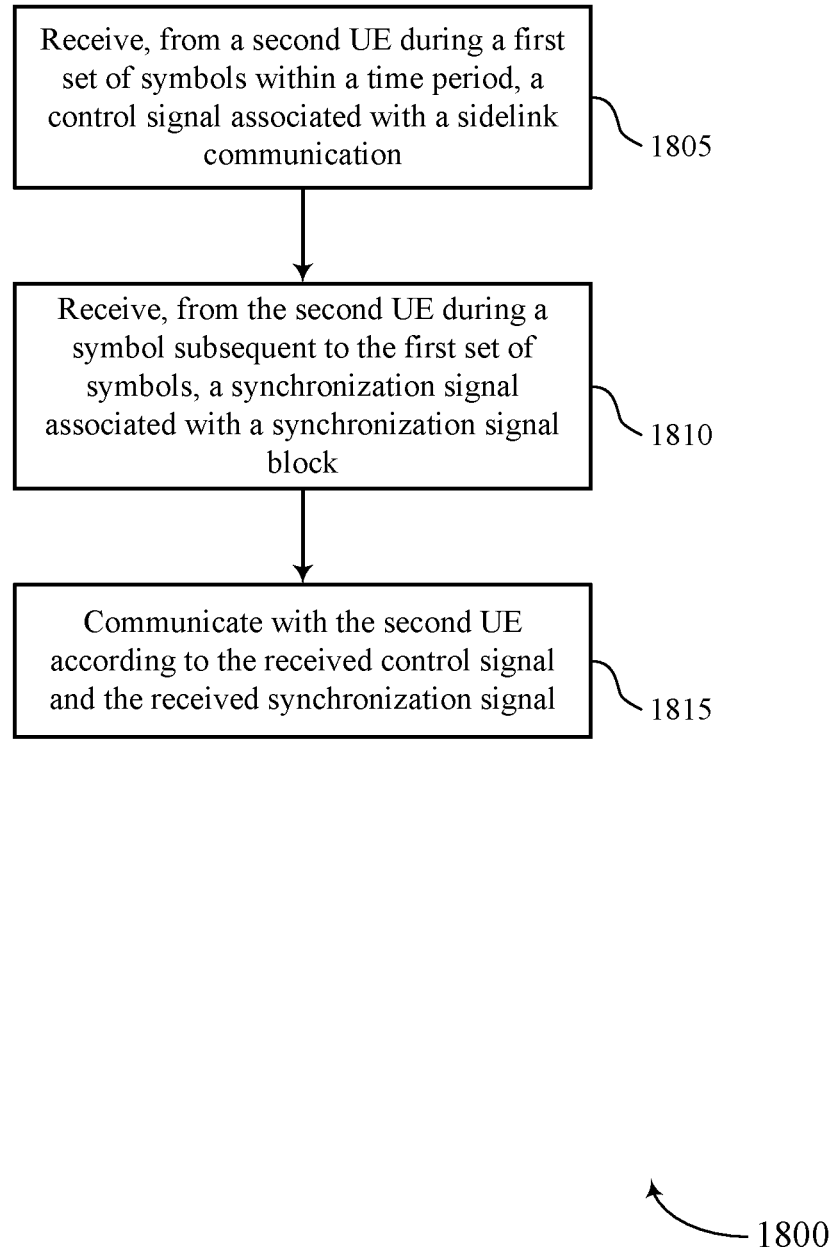

FIG. 18 shows a flowchart illustrating a method 1800 that supports techniques for synchronization signal block waveform design for sidelink communications in accordance with aspects of the present disclosure. The operations of method 1800 may be implemented by a UE 115 or its components as described herein. For example, the operations of method 1800 may be performed by a communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 1805, the UE may receive, from a second UE during a first set of symbols within a time period, a control signal associated with a sidelink communication. The operations of 1805 may be performed according to the methods described herein. In some examples, aspects of the operations of 1805 may be performed by a reception component as described with reference to FIGS. 11 through 14.

At 1810, the UE may receive, from the second UE during a symbol subsequent to the first set of symbols, a synchronization signal associated with a synchronization signal block. The operations of 1810 may be performed according to the methods described herein. In some examples, aspects of the operations of 1810 may be performed by a reception component as described with reference to FIGS. 11 through 14.

At 1815, the UE may communicate with the second UE according to the received control signal and the received synchronization signal. The operations of 1815 may be performed according to the methods described herein. In some examples, aspects of the operations of 1815 may be performed by a communication component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
   determining that the first UE is scheduled to transmit a control signal and a synchronization signal associated with a synchronization signal block;
   transmitting, to a second UE during a first set of symbols within a time period, the control signal associated with a sidelink communication;
   identifying that the control signal is mapped to the first set of symbols comprising a first symbol and a second symbol;
   identifying that a primary synchronization signal is mapped to a second set of symbols subsequent to the first set of symbols within the time period, the second set of symbols comprising a third symbol, a fourth symbol, and a fifth symbol;
   transmitting, to the second UE during a symbol subsequent to the first set of symbols, the synchronization signal associated with the synchronization signal block, wherein transmitting the synchronization signal comprises transmitting the primary synchronization signal during the third symbol; and
   communicating with the second UE according to the transmitted control signal and the transmitted synchronization signal.

2. The method of claim 1, further comprising:
   identifying that the control signal is mapped to the first set of symbols comprising a first symbol, a second symbol and a third symbol; and
   identifying that a primary synchronization signal is mapped to a second set of symbols subsequent to the first set of symbols within the time period, the second set of symbols comprising a fourth symbol, and a fifth symbol, wherein transmitting the synchronization signal during the symbol comprises transmitting the primary synchronization signal during the fourth symbol.

3. The method of claim 1, further comprising:
   identifying that the control signal is mapped to the first set of symbols comprising a first symbol and a second symbol; and
   identifying that a signal associated with a physical broadcast channel is mapped to a second set of symbols subsequent to the first set of symbols within the time period, the second set of symbols comprising a third symbol and a fourth symbol, wherein transmitting the synchronization signal during the symbol comprises transmitting the signal associated with the physical broadcast channel during the third symbol.

4. The method of claim 1, further comprising:
   identifying that the control signal is mapped to the first set of symbols comprising a first symbol, a second symbol and a third symbol; and identifying that a signal associated with a physical broadcast channel is mapped to a fourth symbol subsequent to the first set of symbols within the time period, wherein transmitting the synchronization signal during the symbol comprises transmitting the signal associated with the physical broadcast channel during the fourth symbol.

5. The method of claim 4, further comprising:
transmitting, to the second UE during a fifth symbol subsequent to the fourth symbol, a primary synchronization signal; and
transmitting, to the second UE during a sixth symbol subsequent to the fifth symbol, a repetition of the signal associated with a physical broadcast channel.

6. The method of claim 1, further comprising:
identifying that the control signal is mapped to the first set of symbols comprising a first symbol and a second symbol; and
rate matching a signal associated with a physical broadcast channel to a second set of symbols comprising a third symbol subsequent to the first set of symbols within the time period, wherein transmitting the synchronization signal during the symbol comprises transmitting the signal associated with the physical broadcast channel during the third symbol.

7. The method of claim 6, further comprising:
transmitting, to the second UE during a third set of symbols, a first set of synchronization signals associated with the synchronization signal block, wherein the second set of symbols is a subset of the third set of symbols; and
transmitting, to the second UE during a fourth set of symbols subsequent to the third set of symbols, a second set of synchronization signals associated with a second synchronization signal block.

8. The method of claim 7, wherein a second symbol subsequent to the fourth set of symbols within the time period comprises a repetition of a signal associated with a second physical broadcast channel included in the second synchronization signal block.

9. The method of claim 7, wherein a second symbol subsequent to the fourth set of symbols within the time period comprises a gap symbol.

10. Method of claim 6, wherein the second set of symbols comprises four symbols.

11. The method of claim 1, further comprising:
identifying that the control signal is mapped to the first set of symbols comprising a first symbol, a second symbol and a third symbol; and
rate matching a signal associated with a physical broadcast channel to a second set of symbols comprising a fourth symbol subsequent to the first set of symbols within the time period, wherein transmitting the synchronization signal during the symbol comprises transmitting the signal associated with the physical broadcast channel during the fourth symbol.

12. The method of claim 1, further comprising:
identifying that the synchronization signal block is mapped to a second set of symbols subsequent to the first set of symbols, the synchronization signal block comprising a primary synchronization signal, a secondary synchronization signal and a physical broadcast channel.

13. The method of claim 12, further comprising:
determining that a first set of resource blocks is mapped to the secondary synchronization signal and a second set of resource blocks is mapped to the physical broadcast channel in a first symbol included in the second set of symbols.

14. The method of claim 13, further comprising:
transmitting, during the first symbol, the first set of resource blocks mapped to the secondary synchronization signal, the second set of resource blocks is mapped to the physical broadcast channel and one or more additional resource blocks mapped to the physical broadcast channel.

15. The method of claim 13, further comprising:
identifying one or more empty resource elements consecutive to the first set of resource blocks mapped to the secondary synchronization signal;
mapping the physical broadcast channel to the one or more empty resource elements in the first symbol; and
transmitting, during the first symbol, the first set of resource blocks mapped to the secondary synchronization signal, the second set of resource blocks is mapped to the physical broadcast channel and the one or more mapped resource elements.

16. The method of claim 15, wherein a sum of the first set of resource blocks, the second set of resource blocks and the one or more mapped resource elements comprise a total number of resource blocks mapped to the physical broadcast channel in a second symbol consecutive to the first symbol.

17. The method of claim 12, further comprising:
determining that a first set of resource blocks is mapped to the primary synchronization signal in a first symbol included in the second set of symbols.

18. The method of claim 17, further comprising:
transmitting, during the first symbol, the first set of resource blocks mapped to the primary synchronization signal and a second set of resource blocks is mapped to the physical broadcast channel.

19. The method of claim 18, further comprising:
rate matching a signal associated with the physical broadcast channel on the second set of resource blocks.

20. The method of claim 1, further comprising:
determining a first energy per resource element associated with a physical broadcast channel and a second energy per resource element associated with a primary synchronization signal, wherein the synchronization signal block comprises the primary synchronization signal, a secondary synchronization signal and the physical broadcast channel.

21. The method of claim 20, further comprising:
transmitting, during a first symbol, a signal associated with the physical broadcast channel using a third energy per resource element, wherein the third energy per resource element is less than the first energy per resource element; and
transmitting, during a second symbol subsequent to the first symbol, the primary synchronization signal using a fourth energy per resource element, wherein the fourth energy per resource element is greater than the second energy per resource element.

22. The method of claim 1, further comprising:
identifying that the synchronization signal block is mapped to a second set of symbols subsequent to the first set of symbols within the time period;
identifying that a second synchronization signal block is mapped to a third set of symbols subsequent to the second set of symbols within the time period; and
transmitting, to the second UE during the third set of symbols, a set of synchronization signals associated with the second synchronization signal block.

23. The method of claim 1, wherein a sequence for a primary synchronization signal or a secondary synchronization signal associated with a direct interface is same as the sequence for the primary synchronization signal associated with a network interface.

24. A method for wireless communication at a first user equipment (UE), comprising:
receiving, from a second UE during a first set of symbols within a time period, a control signal associated with a sidelink communication;
identifying that the control signal is mapped to the first set of symbols comprising a first symbol and a second symbol;
identifying that a primary synchronization signal is mapped to a second set of symbols subsequent to the first set of symbols within the time period, the second set of symbols comprising a third symbol, a fourth symbol, and a fifth symbol;
receiving, from the second UE during a symbol subsequent to the first set of symbols, a synchronization signal associated with a synchronization signal block, wherein receiving the synchronization signal comprises receiving the primary synchronization signal during the third symbol; and
communicating with the second UE according to the received control signal and the received synchronization signal.

25. The method of claim 24, further comprising:
identifying that the control signal is mapped to the first set of symbols comprising a first symbol, a second symbol and a third symbol; and
identifying that a primary synchronization signal is mapped to a second set of symbols subsequent to the first set of symbols within the time period, the second set of symbols comprising a fourth symbol, and a fifth symbol, wherein receiving the synchronization signal during the symbol comprises receiving the primary synchronization signal during the fourth symbol.

26. An apparatus for wireless communication at a first user equipment (UE), comprising:
a processor,
memory coupled with the processor; and
instructions stored in the memory and executable by the processor to cause the apparatus to:
determine that the first UE is scheduled to transmit a control signal and a synchronization signal associated with a synchronization signal block;
transmit, to a second UE during a first set of symbols within a time period, the control signal associated with a sidelink communication;
identify that the control signal is mapped to the first set of symbols comprising a first symbol and a second symbol;
identify that a primary synchronization signal is mapped to a second set of symbols subsequent to the first set of symbols within the time period, the second set of symbols comprising a third symbol, a fourth symbol, and a fifth symbol;
transmit, to the second UE during a symbol subsequent to the first set of symbols, the synchronization signal associated with the synchronization signal block, wherein transmit the synchronization signal comprises transmitting the primary synchronization signal during the third symbol; and
communicate with the second UE according to the transmitted control signal and the transmitted synchronization signal.

27. The apparatus of claim 26, wherein the instructions are further executable by the processor to cause the apparatus to:
identify that the control signal is mapped to the first set of symbols comprising a first symbol, a second symbol and a third symbol; and
identify that a primary synchronization signal is mapped to a second set of symbols subsequent to the first set of symbols within the time period, the second set of symbols comprising a fourth symbol, and a fifth symbol, wherein transmitting the synchronization signal during the symbol comprises transmitting the primary synchronization signal during the fourth symbol.

28. The apparatus of claim 26, wherein the instructions are further executable by the processor to cause the apparatus to:
identify that the control signal is mapped to the first set of symbols comprising a first symbol and a second symbol; and
identify that a signal associated with a physical broadcast channel is mapped to a second set of symbols subsequent to the first set of symbols within the time period, the second set of symbols comprising a third symbol and a fourth symbol, wherein transmitting the synchronization signal during the symbol comprises transmitting the signal associated with the physical broadcast channel during the third symbol.

29. The apparatus of claim 26, wherein the instructions are further executable by the processor to cause the apparatus to:
identify that the control signal is mapped to the first set of symbols comprising a first symbol, a second symbol and a third symbol; and
identify that a signal associated with a physical broadcast channel is mapped to a fourth symbol subsequent to the first set of symbols within the time period, wherein transmitting the synchronization signal during the symbol comprises transmitting the signal associated with the physical broadcast channel during the fourth symbol.

30. An apparatus for wireless communication at a first user equipment (UE), comprising:
a processor,
memory coupled with the processor; and
instructions stored in the memory and executable by the processor to cause the apparatus to:
receive, from a second UE during a first set of symbols within a time period, a control signal associated with a sidelink communication;
identify that the control signal is mapped to the first set of symbols comprising a first symbol and a second symbol;
identify that a primary synchronization signal is mapped to a second set of symbols subsequent to the first set of symbols within the time period, the second set of symbols comprising a third symbol, a fourth symbol, and a fifth symbol;
receive, from the second UE during a symbol subsequent to the first set of symbols, a synchronization signal associated with a synchronization signal block, wherein receiving the synchronization signal comprises receiving the primary synchronization signal during the third symbol; and
communicate with the second UE according to the received control signal and the received synchronization signal.

31. A non-transitory computer-readable medium storing code for wireless communication at a first user equipment (UE), the code comprising instructions executable by a processor to:
- determine that the first UE is scheduled to transmit a control signal and a synchronization signal associated with a synchronization signal block;
- transmit, to a second UE during a first set of symbols within a time period, the control signal associated with a sidelink communication;
- identify that the control signal is mapped to the first set of symbols comprising a first symbol and a second symbol;
- identify that a primary synchronization signal is mapped to a second set of symbols subsequent to the first set of symbols within the time period, the second set of symbols comprising a third symbol, a fourth symbol, and a fifth symbol;
- transmit, to the second UE during a symbol subsequent to the first set of symbols, the synchronization signal associated with the synchronization signal block, wherein transmit the synchronization signal comprises transmitting the primary synchronization signal during the third symbol; and
- communicate with the second UE according to the transmitted control signal and the transmitted synchronization signal.

* * * * *